United States Patent
Park et al.

(10) Patent No.: US 9,533,292 B2
(45) Date of Patent: Jan. 3, 2017

(54) METHOD OF PREPARING IRON CARBIDE/CARBON NANOCOMPOSITE CATALYST CONTAINING POTASSIUM FOR HIGH TEMPERATURE FISCHER-TROPSCH SYNTHESIS REACTION AND THE IRON CARBIDE/CARBON NANOCOMPOSITE CATALYST PREPARED THEREBY, AND METHOD OF MANUFACTURING LIQUID HYDROCARBON USING THE SAME AND LIQUID HYDROCARBON MANUFACTURED THEREBY

(71) Applicant: KOREA INSTITUTE OF ENERGY RESEARCH, Daejeon (KR)

(72) Inventors: Ji Chan Park, Daejeon (KR); Heon Jung, Daejeon (KR); Ho Tae Lee, Daejeon (KR); Jung Il Yang, Daejeon (KR); Dong Hyun Chun, Daejeon (KR); Sung Jun Hong, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 476 days.

(21) Appl. No.: 14/099,083

(22) Filed: Dec. 6, 2013

(65) Prior Publication Data

US 2014/0360917 A1    Dec. 11, 2014

(30) Foreign Application Priority Data

Mar. 27, 2013   (KR) ........................ 10-2013-0032580

(51) Int. Cl.
*B01J 21/18* (2006.01)
*B01J 27/22* (2006.01)
(Continued)

(52) U.S. Cl.
CPC ................. *B01J 27/22* (2013.01); *B01J 21/18* (2013.01); *B01J 33/00* (2013.01); *B01J 35/002* (2013.01);
(Continued)

(58) Field of Classification Search
None
See application file for complete search history.

(56) References Cited

U.S. PATENT DOCUMENTS

| 4,340,503 A | 7/1982 | Rao et al. |
| 6,777,452 B2 | 8/2004 | Zhou et al. |

(Continued)

FOREIGN PATENT DOCUMENTS

| JP | 2005-529744 A | 10/2005 |
| JP | 2011-045874 A | 3/2011 |

(Continued)

OTHER PUBLICATIONS

Bahome et al.; Fischer-Tropsch Synthesis Over Iron Catalysts Supported on Carbon Nanotubes; Applied Catalysis A; General 287; pp. 60-67; 2005.*

(Continued)

*Primary Examiner* — Guinever S Gregorio
(74) *Attorney, Agent, or Firm* — Rabin & Berdo, P.C.

(57) ABSTRACT

This invention relates to a method of preparing an iron carbide/carbon nanocomposite catalyst containing potassium for high temperature Fischer-Tropsch (FT) synthesis reaction and the iron carbide/carbon nanocomposite catalyst prepared thereby, and a method of manufacturing a liquid hydrocarbon using the same and a liquid hydrocarbon manufactured thereby, wherein a porous carbon support is uniformly impregnated with an iron hydrate using melt infiltration, and potassium is also supported together via various addition processes, including a pre-addition process of a (Continued)

potassium salt which is ground upon impregnation with the iron hydrate, or a mid- or post-addition process of a potassium solution using incipient wetness impregnation after impregnation with the iron hydrate. Accordingly, the highly active iron carbide/potassium/carbon composite catalyst for high temperature FT reaction in which 5~30 wt % of active iron carbide particles are supported on the porous carbon support can be obtained and is structurally stable to heat even in high temperature FT reaction of 300° C. or more, and liquid hydrocarbons can be selectively obtained at high yields.

35 Claims, 16 Drawing Sheets

(51) Int. Cl.
B01J 33/00 (2006.01)
B01J 35/00 (2006.01)
B01J 37/00 (2006.01)
B01J 37/08 (2006.01)
C10G 2/00 (2006.01)

(52) U.S. Cl.
CPC ............. *B01J 37/0036* (2013.01); *B01J 37/08* (2013.01); *C10G 2/332* (2013.01)

(56) References Cited

U.S. PATENT DOCUMENTS

| | | | |
|---|---|---|---|
| 2004/0009871 A1* | 1/2004 | Hu | B01J 23/745 502/338 |
| 2005/0130838 A1* | 6/2005 | Duan | B01J 23/002 502/328 |
| 2005/0250863 A1* | 11/2005 | Green | B01J 23/22 518/703 |
| 2006/0240256 A1* | 10/2006 | Woo | B82Y 30/00 428/402 |
| 2014/0080694 A1* | 3/2014 | Cai | C01B 31/30 502/11 |

FOREIGN PATENT DOCUMENTS

| | | |
|---|---|---|
| KR | 10-2010-0104934 A | 9/2010 |
| KR | 10-2011-0008591 A | 1/2011 |

OTHER PUBLICATIONS

Jiao et al.; The Mechanism of Potassium Promoter: Enhancing the Stability of Active Surfaces; Angew. Chem. Int. Ed.; 50, 7403-7406; 2011.*
Andrei Y. Khodakov et al., "Advances in the Development of Novel Cobalt Fischer-Tropsch Catalysts for Synthesis of Long-Chain Hydrocarbons and Clean Fuels", Chem. Rev., 2007, pp. 1692-1744, vol. 107, No. 5.
A. P. Steynberg, et al., "High temperature Fischer-Tropsch synthesis in commercial practice", Applied Catalysis A: General, 1999, pp. 41-54, vol. 186.
Dan C. Sorescu, "Adsorption and activation of CO coadsorbed with K on Fe (100) surface: A plane-wave DFT study", Surface Science, 2011, pp. 401-414, vol. 605.
Zhi-Pan Liu et al., An Insight into Alkali Promotion: A Density Functional Theory Study of CO Dissociation on K/Rh (111), J. Am. Chem. Soc., 2001, pp. 12596-12604, vol. 123.
Stephen J. Jenkins et al., A Role for Induced Molecular Polarization in Catalytic Promotion: CO Coadsorbed with K on Co{1010}, J. Am. Chem. Soc., 2000, pp. 10610-10614, vol. 122.
Chun-Fang Huo et al., "The Mechanism of Potassium Promoter: Enhancing the Stability of Active Surfaces", Angew. Chem. Int. Ed., 2011, pp. 7403-7406, vol. 50.
Bert M. Weckhuysen et al., "The renaissance of iron-based Fischer-Tropsch synthesis: on the multifaceted catalyst deactivation behaviour", Chemical Society Reviews, 2008, pp. 2758-2781, vol. 37.
Qinghong Zhang et al., "Development of Novel Catalysts for Fischer-Tropsch Synthesis: Tuning the Product Selectivity", ChemCatChem, 2010, pp. 1030-1058, vol. 2.
Hiroshige Matsumoto et al., "The Transient Method Applied to the Methanation and Fischer-Tropsch Reactions over a Fused Iron Catalyst", Journal of Catalysis, 1978, pp. 331-344, vol. 53.

* cited by examiner

METHOD OF PREPARING IRON CARBIDE/CARBON NANOCOMPOSITE CATALYST CONTAINING POTASSIUM FOR HIGH TEMPERATURE FISCHER-TROPSCH SYNTHESIS REACTION AND THE IRON CARBIDE/CARBON NANOCOMPOSITE CATALYST PREPARED THEREBY, AND METHOD OF MANUFACTURING LIQUID HYDROCARBON USING THE SAME AND LIQUID HYDROCARBON MANUFACTURED THEREBY

BACKGROUND OF THE INVENTION

1. Field of the Invention

The present invention relates to a method of preparing an iron carbide/carbon nanocomposite catalyst containing potassium for high temperature Fischer-Tropsch synthesis reaction and the iron carbide/carbon nanocomposite catalyst prepared thereby, and a method of manufacturing a liquid hydrocarbon using the iron carbide/carbon nanocomposite catalyst and a liquid hydrocarbon manufactured thereby. More particularly, the present invention relates to a technique of preparing a catalyst composed of a carbon support and both iron and potassium supported thereon wherein the carbon support is maximally uniformly impregnated with an iron hydrate via melt infiltration using a large pore volume thereof, and potassium is also uniformly supported together by means of various addition processes, including a pre-addition process for incorporating a potassium salt which is ground upon impregnation with the iron hydrate, or a mid- or post-addition process for incorporating a potassium solution using incipient wetness impregnation after impregnation with the iron hydrate, and to a technique for manufacturing a liquid hydrocarbon using the catalyst thus prepared.

2. Description of the Related Art

Fischer-Tropsch (FT) synthesis, which is a technique developed in the 1920s by German chemists Franz Fischer and Hans Tropsch, enables synthetic fuel (hydrocarbon) to be synthesized from synthesis gas (hydrogen and carbon monoxide) as represented by the following chemical scheme.

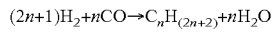

$$(2n+1)H_2 + nCO \rightarrow C_nH_{(2n+2)} + nH_2O$$

In such Fischer-Tropsch synthesis, catalysts containing cobalt and iron are mainly used, and reaction conditions including reaction temperature and pressure, gas composition, etc. considerably vary depending on the kind of applied catalyst.

Fischer-Tropsch synthesis may be largely divided into, depending on the reaction temperature, low temperature Fischer-Tropsch (LIFT) in the temperature range of 200~250° C. and high temperature Fischer-Tropsch (HTFT) in the temperature range of 300~350° C. (Andrei Y. Khodakov et al, Chem. Rev., 2007, 107, 1672).

Typically, in the case of low temperature FT reaction, cobalt-based catalysts having a comparatively long lifetime are mainly adopted, and are advantageous because they have high activity and a long lifetime, but are problematic because they are susceptible to poisoning by sulfur compounds or the like or are very expensive compared to iron-based catalysts. Furthermore, the cobalt-based catalysts have little activity in water gas shift (WGS) and thus the ratio of synthesis gas composition (hydrogen:carbon monoxide=2:1) upon FT synthesis reaction has a great influence on the reaction.

On the other hand, iron-based catalysts are active in water gas shift, and may thus be used at various composition ratios of hydrogen to carbon monoxide in the range of 1~2, and may also be utilized even in the presence of carbon dioxide which is an impurity gas. Hence, upon high temperature FT reaction which is carried out commercially on large scale, iron-based catalysts which are comparatively inexpensive and are resistant to poisoning by sulfur compounds have been mainly used. A typical example of high temperature FT reaction using a commercially available iron-based catalyst to date may include a Synthol process using an iron-based catalyst composed of fused iron (Fe) available from Sasol (Steynberg A. P. et al Appl. Catal. A: Gen., 1999, 186, 41).

However, fused Fe is disadvantageous because a variety of impurities may be contained upon preparation thereof and catalytic activity is low.

In the case of iron catalysts currently used in commercial processes, various promoters including potassium, copper, silica, etc., are used together to drastically improve catalytic performance. In particular, potassium is well known to increase reactivity of the catalyst in FT reaction, decrease production of methane and improve chain growth selectivity of hydrocarbon. Potassium is also well known to exhibit electronic effects as a typical base (D. C. Sorescu et al., Surf. Sci., 2011, 605, 401.; Z. P. Liu et al., J. Am. Chem. Soc., 2001, 123, 12596; S. J. Jenkins et al., J. Am. Chem. Soc., 2000, 122, 10610.). Recently, potassium is reported to partially participate in forming the active surface of iron particles (C.-F. Huo et al, Angew. Chem. Int. Ed., 2011, 50, 7403).

U.S. Pat. No. 4,340,503 discloses preparation of an iron-supported catalyst composed of a silicate support and iron and potassium supported thereon, and synthesis of $C_2$~$C_4$ olefins from synthesis gas using a fluidized-bed reactor.

Preparation of iron-based catalysts using co-precipitation is performed by precipitating any iron-based precursor in the form of nitrate in the presence of an alkali which is exemplified by ammonium hydroxide. Upon using potassium oxide ($K_2O$), it may accelerate the reaction to thus improve reaction performance. As such, potassium is appropriately used at a weight ratio of 0.1~0.5 relative to Fe 100. Particularly, when potassium is added to the iron-based catalyst, the yield of high-boiling-point hydrocarbon having high molecular weight may be increased and the ratio of olefin and paraffin may be raised in the hydrocarbon product.

Thus, the optimal potassium concentration may favorably increase activity of FT synthesis reaction and also decrease selectivity of methane.

Below is a more detailed description of the related techniques.

Although thorough research into FT reaction has been carried out for almost 100 years since the 1920s, whether the active species of the catalyst actually participating in FT reaction is the metallic iron surface, surface or bulk iron carbide, or iron oxide is still controversial. Because activation energy is lower when carbon is diffused and thus converted into iron carbide than when FT reaction occurs on the metallic iron surface, preparation in the form of iron carbide is regarded as very important. Thereby, an induction period may be minimized, and more preferably, among various iron carbide phases, Hägg carbide (c-$Fe_5C_2$) having high activity needs to be efficiently formed (Weckhuysen, B. M. et al. Chem. Soc. Rev., 2008, 37, 2758).

As for catalysts for FT synthesis reaction, when iron-based catalysts are applied to low temperature FT reaction, catalysts resulting from a co-precipitation method have been mostly employed (Korean Patent No. 10-1087165, which discloses a method for preparing of Fe based catalyst used in Fischer-Tropsch systhesis reaction and that of liquid hydrocarbon using Fe based catalyst). This catalyst is advantageous because the amount of iron is high based on the total weight of the catalyst, thus enabling supporting of iron in a large amount.

However, this catalyst is problematic because of complicated preparation procedures, low catalyst reliability, catalyst coking due to carbon monoxide, and instability at high temperature.

Whereas, in the case of high temperature FT synthesis reaction for producing hard naphtha or gasoline, fused Fe particles have been mainly used in commercial processes, and supported catalysts using supports have been mostly applied in the research step of small laboratory scale (Qinghong Zhang et. al., ChemCatChem 2010, 2, 1030).

In the case of fused Fe used in commercial processes, it is made by being fused at a very high temperature of 1000° C. or more and is thus high in mechanical strength but undesirably has a large catalyst crystalline size and low activity (Hiroshige Matsujioto et. al., J. Catal. 1978, 53, 331).

In order to increase catalytic reduction capacity of iron catalysts, copper is used, or potassium is additionally used to increase catalytic activity.

However, methods of uniformly impregnating an iron catalyst composed of a carbon support with potassium have not yet been introduced, and there are no reports for comparing activities of such a catalyst in high temperature FT reaction depending on the amount of added potassium. In the case of the carbon support, it is stable to steam generated during high temperature FT reaction, and is favorable for heat transfer, and the inside of the carbon support may provide the atmosphere which is desirable in terms of reduction and activation of the particles, and this support may be also effective at adsorbing a carbon monoxide (CO) reactant.

Therefore, a need exists to develop techniques for preparing an iron catalyst composed of a carbon support and potassium uniformly supported thereon and for producing a liquid hydrocarbon using the same.

SUMMARY OF THE INVENTION

Accordingly, the present invention has been made keeping in mind the above problems encountered in the related art, and an object of the present invention is to provide a method of preparing an iron carbide/carbon nanocomposite catalyst for high temperature FT synthesis reaction and the iron carbide/carbon nanocomposite catalyst prepared thereby, wherein, while a porous carbon support is uniformly impregnated with an iron hydrate using melt infiltration, potassium is uniformly supported together using co-melt infiltration of a potassium salt or incipient wetness impregnation.

Another object of the present invention is to provide a method of manufacturing a liquid hydrocarbon using the iron carbide/carbon nanocomposite catalyst containing potassium for high temperature FT synthesis reaction and a liquid hydrocarbon manufactured thereby.

In order to accomplish the above objects and overcome the conventional problems, an aspect of the present invention provides a method of preparing an iron carbide/carbon nanocomposite catalyst containing potassium for high temperature FT synthesis reaction, including mechanically uniformly grinding an iron hydrate, a potassium salt and a porous carbon support, thus forming a mixed powder; subjecting the mixed powder to melt infiltration at a temperature near a melting point of the iron hydrate in a reaction vessel; drying the mixed powder at room temperature; calcining the dried mixed powder at a high temperature in an activation gas atmosphere so as to be activated to form iron carbide particles containing potassium on the carbon support, thus obtaining an iron carbide/carbon nanocomposite catalyst containing potassium; adding the calcined iron carbide/carbon nanocomposite catalyst containing potassium to an organic solvent so as to be stabilized via anti-oxidation passivation; and recovering the iron carbide/carbon nanocomposite catalyst containing potassium from the organic solvent using a magnet, and then performing vacuum drying.

Another aspect of the present invention provides a method of preparing an iron carbide/carbon nanocomposite catalyst containing potassium for high temperature FT synthesis reaction, including mechanically uniformly grinding an iron hydrate and a porous carbon support, thus forming a mixed powder; subjecting the mixed powder to melt infiltration at a temperature near a melting point of the iron hydrate in a reaction vessel; drying the mixed powder at room temperature; impregnating the dried mixed powder with a potassium salt aqueous solution using incipient wetness impregnation; calcining the mixed powder impregnated with potassium at a high temperature in an activation gas atmosphere so as to be activated to form iron carbide particles containing potassium on the carbon support, thus obtaining an iron carbide/carbon nanocomposite catalyst containing potassium; adding the calcined iron carbide/carbon nanocomposite catalyst containing potassium to an organic solvent so as to be stabilized via anti-oxidation passivation; and recovering the iron carbide/carbon nanocomposite catalyst containing potassium from the organic solvent using a magnet, and then performing vacuum drying.

Still another aspect of the present invention provides a method of preparing an iron carbide/carbon nanocomposite catalyst containing potassium for high temperature FT synthesis reaction, including mechanically uniformly grinding an iron hydrate and a porous carbon support, thus forming a mixed powder; subjecting the mixed powder to melt infiltration at a temperature near a melting point of the iron hydrate in a reaction vessel; drying the mixed powder at room temperature; calcining the dried mixed powder at a high temperature in an activation gas atmosphere so as to be activated to form potassium-free pure iron carbide particles on the carbon support, thus obtaining an iron carbide/carbon nanocomposite catalyst; adding the calcined iron carbide/carbon nanocomposite catalyst to an organic solvent so as to be stabilized via anti-oxidation passivation, and then performing drying; impregnating the dried mixed powder with a potassium salt aqueous solution using incipient wetness impregnation; calcining the mixed powder impregnated with potassium at a high temperature in an activation gas atmosphere so as to be activated to form iron carbide particles containing potassium on the carbon support, thus obtaining an iron carbide/carbon nanocomposite catalyst containing potassium; adding the activated iron carbide/carbon nanocomposite catalyst containing potassium to an organic solvent so as to be stabilized via anti-oxidation passivation, and then performing drying; and recovering the iron carbide/carbon nanocomposite catalyst containing potassium from the organic solvent using a magnet, and then performing vacuum drying.

In a preferred embodiment, the iron hydrate may be supported in an amount of 0.5~3.0 g per unit gram of the carbon support.

In a preferred embodiment, the amount of an iron element decomposed from the iron hydrate may be 5~30 wt %, and the amount of a potassium element may be 0.1~3.0 wt %, based on the total amount of the catalyst including the carbon support.

In a preferred embodiment, the iron hydrate may have a melting point of 30~100° C.

In a preferred embodiment, the iron hydrate may be at least one selected from among $Fe(NO_3)_3 9H_2O$ (d=1.68 g/cm$^3$, m.p.=47.2° C.), $FeCl_3 6H_2O$ (d=1.82 g/cm$^3$, m.p.=37° C.), and $FeSO_4 7H_2O$ (1.898 g/cm$^3$, m.p.=70° C.)

In a preferred embodiment, the porous carbon support may have a minimum pore volume of 0.2 cm$^3$/g or more.

In a preferred embodiment, the porous carbon support may be any one selected from among commercially available activated carbon, commercially available activated charcoal, commercially available acetylene carbon black, and ordered mesoporous carbon CMK (CMK-3, CMK-5, CMK-8).

In a preferred embodiment, the calcining may be performed at 300~400° C.

In a preferred embodiment, the activation gas may be any one selected from among carbon monoxide, hydrogen, and a gas mixture (carbon monoxide+hydrogen).

In a preferred embodiment, the calcining may be performed for 1~24 hr while allowing the activation gas at a rate of 100 ml or more per min.

In a preferred embodiment, the melt infiltration may be performed in a closed system under a temperature condition in which the temperature of the reaction vessel is set to be higher by 2~5° C. than the melting point of the iron hydrate.

In a preferred embodiment, the organic solvent may be any one selected from among ethanol and mineral oil.

In a preferred embodiment, the potassium salt may be used in a solution state by being dissolved in water or an organic solvent, and may be any one or more selected from among KOH, KI, KCl, KBr, $K_2CO_3$, $K_2Cr_2O_7$, $KNO_3$, $KC_2H_3O_2$, $KMnO_4$, KCN, $KIO_3$, $K_2S_2O_8$, $K_2SO_4$, KSCN, $KClO_3$, KF, KH, $KH_2PO_4$, $C_4H_9KO$, and $C_6H_5K_3O_7$.

In addition, a further aspect of the present invention provides an iron carbide/carbon nanocomposite catalyst for high temperature FT synthesis reaction, which is prepared by the above method and in which iron carbide formed after calcination for activation of iron and potassium uniformly supported on a porous carbon support is mainly Hagg carbide (c-$Fe_5C_2$).

In a preferred embodiment, based on the total amount of the catalyst including the carbon support, the amount of iron may be 5~30 wt %, the amount of potassium may be 0.1~3.0 wt %, and the remainder may be the carbon support.

In a preferred embodiment, the porous carbon support may have a minimum pore volume of 0.2 cm$^3$/g or more.

In a preferred embodiment, the porous carbon support may be any one selected from among commercially available activated carbon, commercially available activated charcoal, commercially available acetylene carbon black, and ordered mesoporous carbon CMK (CMK-3, CMK-5, CMK-8).

In addition, a still further aspect of the present invention provides a method of manufacturing a liquid hydrocarbon using an iron carbide/carbon nanocomposite catalyst containing potassium for high temperature FT synthesis reaction, including placing the iron carbide/carbon nanocomposite catalyst in a tube-shaped fixed-bed reactor; feeding synthesis gas into the tube-shaped fixed-bed reactor; and subjecting the synthesis gas and the iron carbide/carbon nanocomposite catalyst to FT synthesis reaction at a high temperature in the tube-shaped fixed-bed reactor, thus manufacturing a liquid hydrocarbon.

In a preferred embodiment, the synthesis gas may include carbon monoxide and hydrogen, with or without an impurity including any one selected from among an inert gas, methane and carbon dioxide.

In a preferred embodiment, the synthesis gas may include carbon monoxide and hydrogen mixed at a ratio of 1:1.

In a preferred embodiment, the synthesis gas may be fed at a gas hourly space velocity of 6.0~24.0 NL/$g_{cat}$/hr into the tube-shaped fixed-bed reactor.

In a preferred embodiment, the reaction may be carried out at 250~350° C.

In addition, a yet further aspect of the present invention provides a liquid hydrocarbon, manufactured by the above method using the iron carbide/carbon nanocomposite catalyst for high temperature FT synthesis reaction.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Hereinafter, preferred embodiments of the present invention will be described in detail with reference to the accompanying drawings. In the following description, it is to be noted that, when the functions of conventional elements and the detailed description of elements related with the present invention may make the gist of the present invention unclear, a detailed description of those elements will be omitted.

Figure 1:
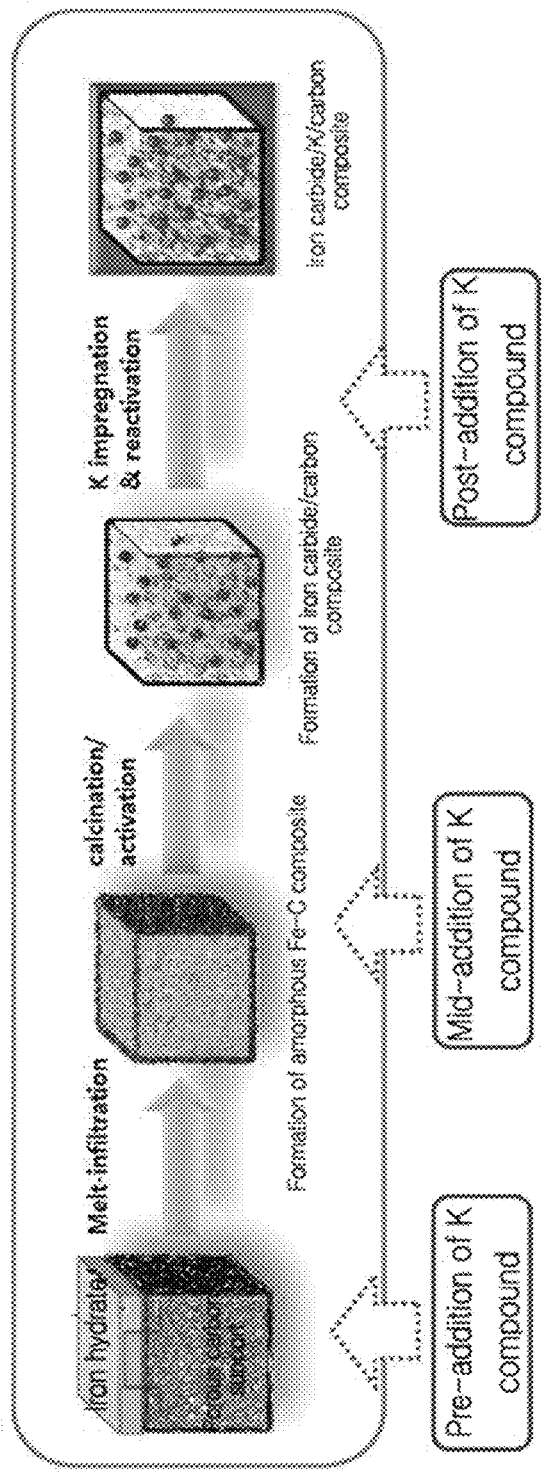
FIG. 1 is a schematic view illustrating a process of preparing an iron carbide/carbon nanocomposite catalyst containing potassium for FT synthesis reaction according to an embodiment of the present invention.

As illustrated in FIG. 1, a method of preparing an iron carbide/carbon nanocomposite catalyst containing potassium for high temperature FT synthesis reaction according to the present invention includes a typical step of preparing an iron carbide/carbon nanocomposite catalyst, and adding a potassium compound at a variety of addition periods during the above step to activate the catalyst. That is, while a carbon support is maximally uniformly impregnated with an iron hydrate through melt infiltration using a large pore volume thereof, potassium is also uniformly supported together with the iron hydrate.

Specifically, an iron hydrate and a porous carbon support are mechanically ground and mixed, the mixed powder is subjected to melt infiltration at a temperature near the melting point of the iron hydrate to form an iron hydrate/carbon composite powder, and the iron hydrate/carbon composite powder is calcined and decomposed at high temperature in an activation gas atmosphere so as to be activated to form iron carbide particles supported on the carbon support, thus obtaining an iron carbide/carbon nanocomposite catalyst, which is then added to ethanol and thus stabilized via passivation.

The aforementioned catalyst process according to the present invention further includes adding a potassium compound in three ways depending on the addition period thereof. That is, the potassium compound may be added by a pre-addition process, a mid-addition process or a post-addition process depending on the addition period thereof using co-melt infiltration and incipient wetness impregnation.

Particularly, a pre-addition process is performed in such a manner that, in the initial step of mixing an iron hydrate and a carbon support upon preparation of an iron carbide/carbon nanocomposite catalyst through melt infiltration, a potassium salt is added together with the iron hydrate using co-melt infiltration.

Also, a mid-addition process is performed in such a manner that a potassium salt is added using incipient wetness impregnation, in a state in which an iron hydrate is supported on a support and then dried.

Also, a post-addition process is performed in such a manner that an iron carbide/carbon nanocomposite catalyst is completed and then a potassium salt solution is added using incipient wetness impregnation.

When the potassium salt is supported in this way, highly active iron carbide particles containing potassium are obtained through sufficient activation in the presence of activation gas (preferably, carbon monoxide (CO)) at high temperature.

Subsequently, the catalyst comprising the highly active iron carbide particles containing potassium is recovered from ethanol using a magnet and then stored via vacuum drying, thereby preparing an iron carbide/carbon nanocomposite catalyst for FT synthesis reaction according to the present invention.

In the iron/carbon nanocomposite catalyst containing potassium thus prepared, the iron hydrate is activated in the form of iron carbide via external activation in a CO gas atmosphere in a state of being supported on the carbon support. Accordingly, additional activation time in the reactor may be shortened, and variations per reduction conditions may be minimized upon actual application via external activation of the catalyst.

In the iron carbide/carbon nanocomposite catalyst containing potassium according to the present invention, Hägg carbide (c-$Fe_5C_2$) known to have high activity is analyzed to be mainly formed through XRD. Furthermore, this catalyst is thermally stable so as to be adapted for high temperature FP reaction at a high temperature of 300° C. or more due to the addition of potassium, and functions to decrease the production of methane, increase the amount of a liquid hydrocarbon product and greatly improve the total catalytic activity.

Below is a detailed description of a catalyst preparation method depending on the addition period of potassium with reference to the appended drawings.

Figure 2:
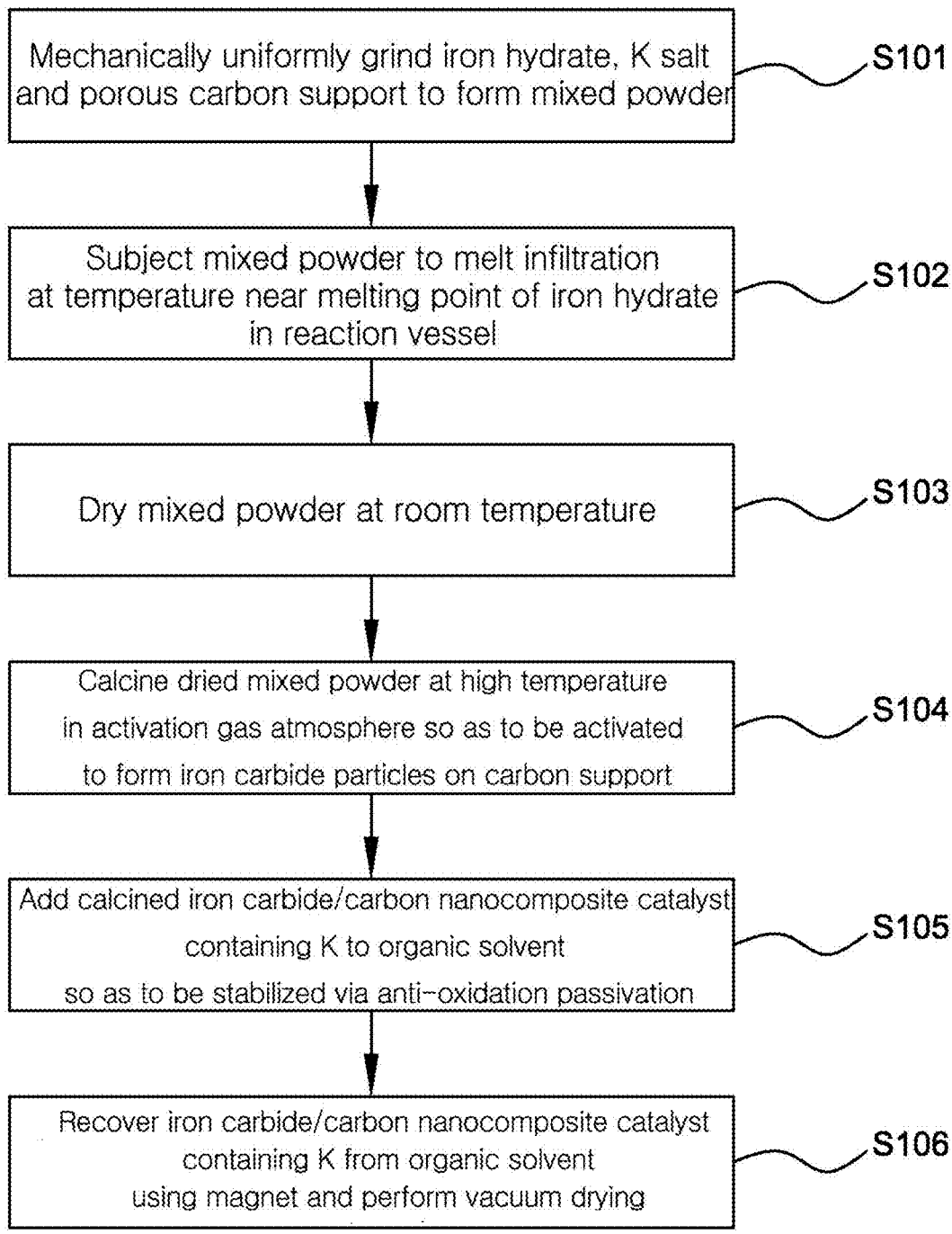
FIG. 2 is a flowchart illustrating preparation of an iron carbide/potassium/carbon nanocomposite catalyst through pre-addition of a potassium salt according to an embodiment of the present invention.

FIG. 2 is a flowchart illustrating a process of preparing an iron carbide/potassium/carbon nanocomposite catalyst through pre-addition of a potassium salt according to an embodiment of the present invention.

As illustrated in this drawing, this preparation method includes mechanically uniformly grinding an iron hydrate, a potassium salt and a porous carbon support, thus forming a mixed powder (S101); subjecting the mixed powder to melt infiltration at a temperature near a melting point (low temperature) of the iron hydrate in a reaction vessel (S102); drying the mixed powder at room temperature (S103); calcining the dried mixed powder at a high temperature in an activation gas atmosphere so as to be activated to form iron carbide particles containing potassium on the carbon support, thus obtaining an iron carbide/carbon nanocomposite catalyst containing potassium (S104); adding the calcined iron carbide/carbon nanocomposite catalyst containing potassium to an organic solvent so as to be stabilized via anti-oxidation passivation (S105); and recovering the iron carbide/carbon nanocomposite catalyst containing potassium from the organic solvent using a magnet and drying it in a vacuum (S106).

Figure 3:
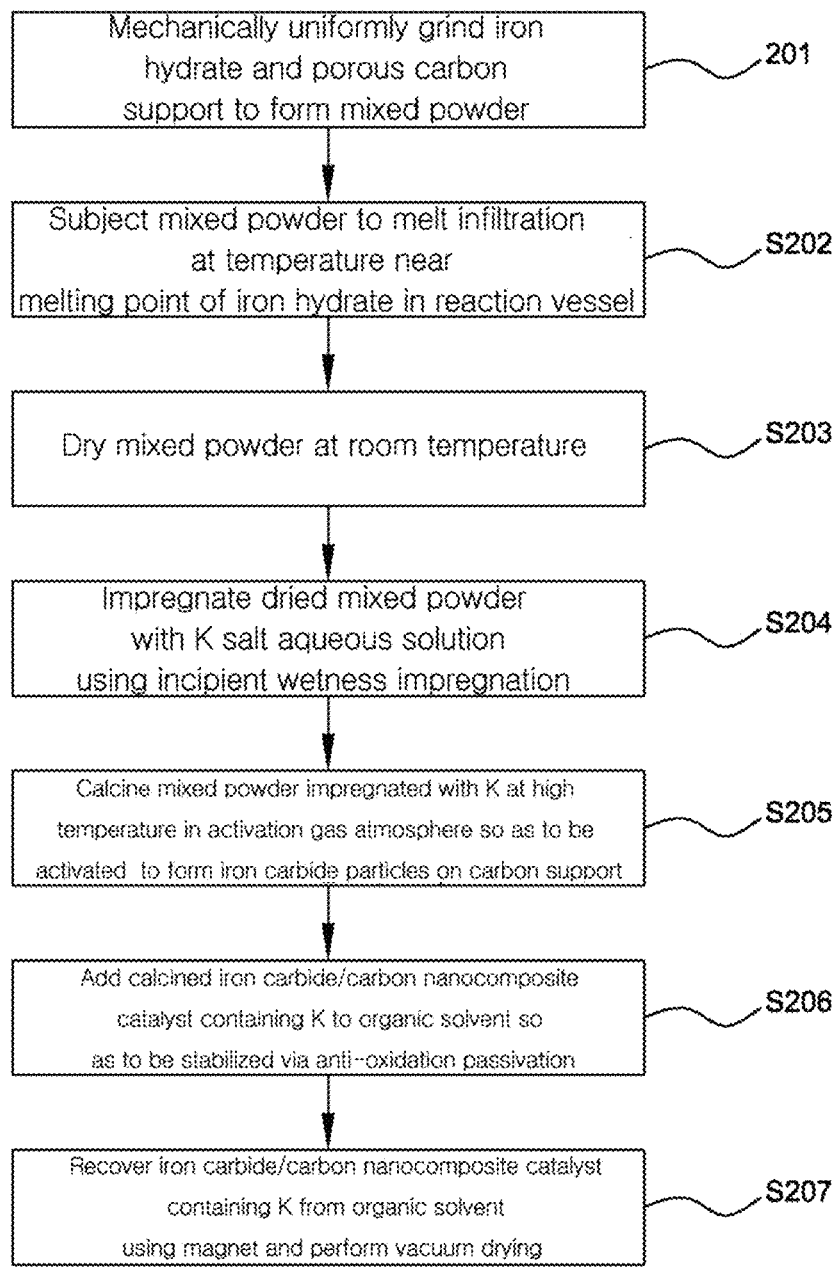
FIG. 3 is a flowchart illustrating preparation of an iron carbide/potassium/carbon nanocomposite catalyst through mid-addition of a potassium salt according to an embodiment of the present invention.

FIG. 3 is a flowchart illustrating a process of preparing an iron carbide/potassium/carbon nanocomposite catalyst through mid-addition of a potassium salt according to an embodiment of the present invention. As illustrated in this drawing, this method is implemented in such a manner that a hydrated iron salt is first subjected to melt infiltration and then dried, after which the dried mixed powder is impregnated with a potassium salt aqueous solution using incipient wetness impregnation.

Specifically, this method includes mechanically uniformly grinding an iron hydrate and a porous carbon support, thus forming a mixed powder (S201); subjecting the mixed powder to melt infiltration at a temperature near a melting point (low temperature) of the iron hydrate in a reaction vessel (S202); drying the mixed powder at room temperature (S203); impregnating the dried mixed powder with a potassium salt aqueous solution using incipient wetness impregnation (S204); calcining the mixed powder impregnated with potassium at a high temperature in an activation gas atmosphere so as to be activated to form iron carbide particles containing potassium on the carbon support, thus obtaining an iron carbide/carbon nanocomposite catalyst containing potassium (S205); adding the calcined iron carbide/carbon nanocomposite catalyst containing potassium to an organic solvent so as to be stabilized via anti-oxidation passivation (S206); and recovering the iron carbide/carbon nanocomposite catalyst containing potassium from the organic solvent using a magnet and then drying it in a vacuum (S207).

Figure 4:
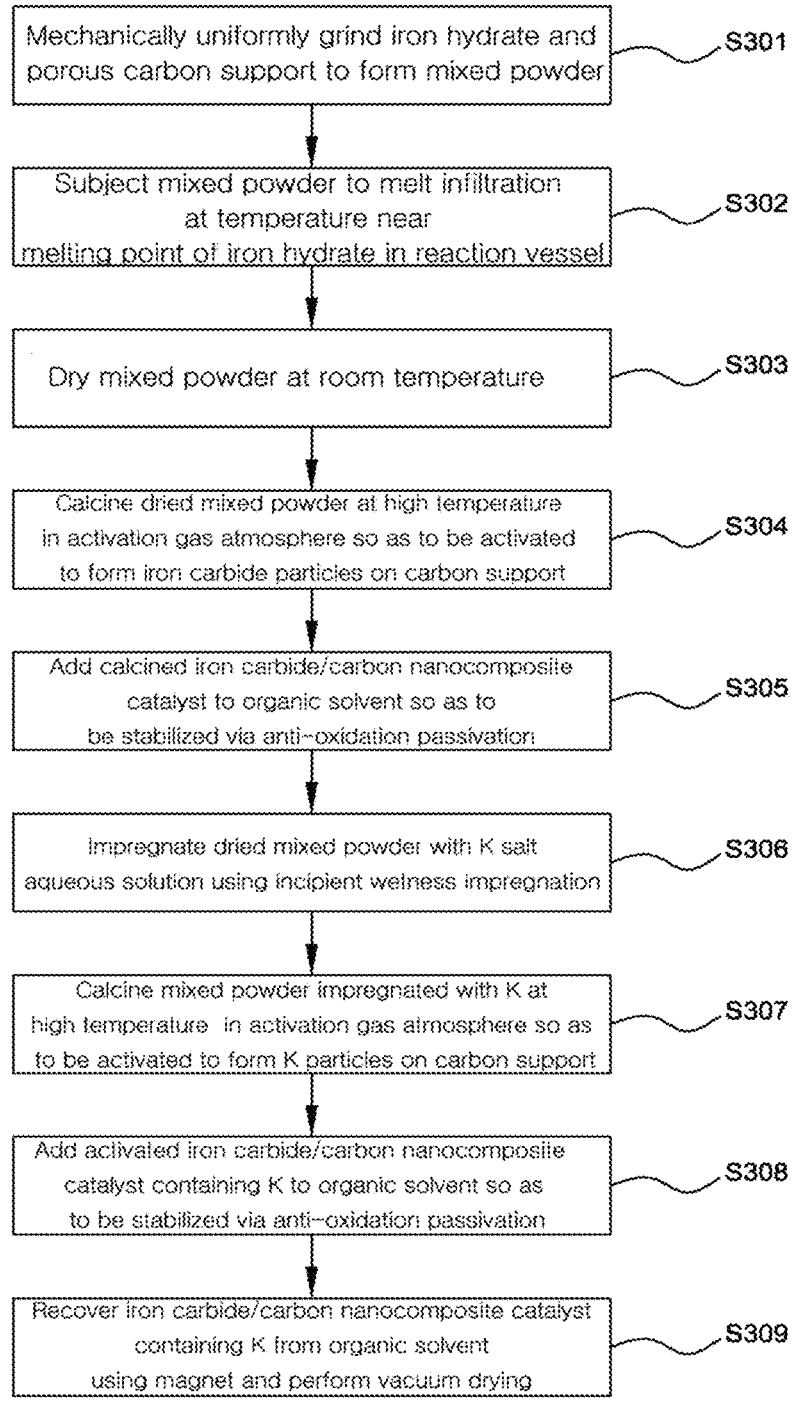
FIG. 4 is a flowchart illustrating preparation of an iron carbide/potassium/carbon nanocomposite catalyst through post-addition of a potassium salt according to an embodiment of the present invention.

FIG. 4 is a flowchart illustrating a process of preparing an iron carbide/potassium/carbon nanocomposite catalyst through post-addition of a potassium salt according to an embodiment of the present invention. As illustrated in this drawing, this method is implemented in such a manner that an iron hydrate is added to a carbon support and activated in the form of iron carbide particles in a CO gas atmosphere at a high temperature and then a potassium aqueous solution is added using incipient wetness impregnation, followed by repeating the activation procedures in a CO gas atmosphere.

Specifically, this method includes mechanically uniformly mixing an iron hydrate and a porous carbon support, thus forming a mixed powder (S301); subjecting the mixed powder to melt infiltration at a temperature near a melting point (low temperature) of the iron hydrate in a reaction vessel (S302); drying the mixed powder at room temperature (S303); calcining the dried mixed powder at a high temperature in an activation gas atmosphere so as to be activated to form potassium-free pure iron carbide particles on the carbon support, thus obtaining an iron carbide/carbon nanocomposite catalyst (S304); adding the calcined iron carbide/carbon nanocomposite catalyst to an organic solvent so as to be stabilized via anti-oxidation passivation, and then drying it (S305); impregnating the dried mixed powder with a potassium salt aqueous solution using incipient wetness impregnation (S306); calcining the mixed powder impregnated with potassium at a high temperature in an activation gas atmosphere so as to be activated to form iron carbide particles containing potassium on the carbon support, thus obtaining an iron carbide/carbon nanocomposite catalyst containing potassium (S307); adding the activated iron carbide/carbon nanocomposite catalyst containing potassium to an organic solvent so as to be stabilized via anti-oxidation passivation and then drying it (S308); and recovering the iron carbide/carbon nanocomposite catalyst containing potassium from the organic solvent using a magnet and then drying it in a vacuum (S309).

Below is a detailed description of the process of preparing the iron carbide/carbon nanocomposite catalyst containing potassium as illustrated in FIGS. 2 and 3.

In the present invention, the amount of the supported iron hydrate may be adjusted depending on the kind of porous carbon support, but is preferably set to 0.5~3.0 g per unit gram of the carbon support in order to uniformly support the particles.

Also, the amount of the potassium element which is added together is set to 0.1~3.0 wt % based on the total amount of the catalyst including the carbon support, and the amount of the iron element used as the catalyst is preferably 5~30 wt % in terms of uniform dispersion of the particles and size of the formed particles. As such, the term "iron element" means that it is decomposed from the iron hydrate and thus finally remains in the catalyst.

Useful in the present invention, the iron hydrate is a hydrated iron compound having a melting point of about 30~100° C., and examples thereof may include $Fe(NO_3)_3 \cdot 9H_2O$ (d=1.68 g/cm$^3$, m.p.=47.2° C.), $FeCl_2 \cdot 6H_2O$ (d=1.82 g/cm$^3$, m.p.=37° C.), $FeSO_4 \cdot 7H_2O$ (1.898 g/cm$^3$, m.p.=70° C.), etc. In particular, an iron compound having a melting point lower than that is difficult to handle because it is in a liquid state at room temperature, and also an iron compound having a high melting point of 100° C. or more is subjected to impregnation under temperature conditions higher than the temperature at which water is boiled, and may thus be boiled, which is undesirable. Moreover, because such metal salts have inherent density values, when the amount of the supported metal salt is determined in consideration of the density of the metal salt and the pore volume of the porous carbon support, the salt may be more evenly supported.

Also, the kind of reaction vessel used in the course of melt infiltration may be selected depending on the amount of the metal hydrate and the reaction temperature, and is exemplified by a reactor made of stainless steel or a vessel made of polypropylene or Teflon among polymeric plastics.

In order to uniformly incorporate the molten iron hydrate into the porous carbon support, it is important to adjust the inner temperature of the reaction vessel and to maintain the pressure thereof. So as to enable complete impregnation with a desired salt, the reaction has to be carried out in a closed system such that the reaction may progress at a temperature higher by about 2~5° C. than the melting point of the iron hydrate, and also that pressure due to vapor pressure generated during the reaction does not disappear externally.

Examples of the porous carbon support which is used together with the iron hydrate may include commercially available activated carbon, commercially available activated charcoal, commercially available acetylene carbon black, ordered mesoporous carbon CMK (CMK-3, CMK-5, CMK-8), etc. To uniformly support the particles in an amount (5~40%) adapted for FP reaction, the minimum pore volume of the carbon material used as the support should be 0.2 cm$^3$/g or more, and a carbon material having as maximally large a pore volume as possible is preferably used to further increase the amount of supported particles.

The calcination conditions after impregnation with the iron hydrate should be set such that the impregnated iron hydrate is sufficiently decomposed and formed into an iron carbide phase having activity, and the calcination temperature is preferably set to 300~400° C., and more preferably about 350° C., so that the particles may exhibit activity without excessively increasing the size thereof.

Useful in the present invention, the activation gas may include carbon monoxide, hydrogen, or a gas mixture (carbon monoxide+hydrogen), but it is preferable that carbon monoxide be used alone in terms of catalyst activation. The calcination time is preferably set to 1~24 hr while allowing the activation gas to flow at a rate of 100 ml or more per min so as to enable sufficient activation.

The passivation process for stabilization of the activated catalyst in an activation gas atmosphere at high temperature is regarded as very important in terms of application of an externally reduced catalyst to subsequent reactions, and plays a role in blocking the reaction between the catalyst and oxygen by use of an organic solvent.

The organic solvent may include any solvent such as ethanol, mineral oil, etc., provided that water able to oxidize and change the catalyst cannot be used. The passivation process is conducted by directly immersing the catalyst in the organic solvent so as not to be exposed to oxygen in an atmosphere containing nitrogen or another inert gas. Preferably useful as the solvent is ethanol which is easily volatile so as to be applied to subsequent analysis or fixed-bed reactors.

Also, in the case of the iron carbide/potassium/carbon catalyst wet with the organic solvent, the catalyst itself is magnetic and thus may be easily separated from the solvent using a magnet. Then, the separated catalyst is dried again in a vacuum and may thus be directly used, or is preferably stored via vacuum packing or nitrogen packing.

In the present invention, the potassium salt which is added using incipient wetness impregnation may be utilized in the form of a solution by being dissolved in water or an organic solvent, and examples of the usable salt may include KOH, KI, KCl, KBr, $K_2CO_3$, $K_2Cr_2O_7$, $KNO_3$, $KC_2H_3O_2$, $KMnO_4$, KCN, $KIO_3$, $K_2S_2O_8$, $K_2SO_4$, KSCN, $KClO_3$, KF, KH, $KH_2PO_4$, $C_4H_9KO$, $C_6H_5K_3O_7$, etc.

In addition, according to the present invention, a liquid hydrocarbon may be effectively manufactured at high CO conversion and selectivity using the iron carbide/carbon nanocomposite catalyst containing potassium prepared as above. That is, immediately after the iron carbide/carbon nanocomposite catalyst containing potassium is added in an activated state into a tube-shaped fixed-bed reactor, synthesis gas is fed into the tube-shaped fixed-bed reactor so that FP synthesis reaction is carried out, thereby manufacturing a liquid hydrocarbon.

Below is a detailed description of the method of manufacturing a liquid hydrocarbon using FP synthesis reaction according to the present invention.

The synthesis gas used in the present invention may include carbon monoxide, hydrogen, and also a material composed of an inert gas, methane or carbon dioxide. More preferably, carbon monoxide and hydrogen are used at a ratio of 1:1 in terms of yield of the product, and as an impurity, carbon dioxide, methane or another inert gas may be contained. As such, the ratio of carbon monoxide and hydrogen refers to a volume ratio. Furthermore, the ratio of synthesis gas in the FP reaction throughout the present invention refers to a volume ratio.

Also, the synthesis gas is preferably fed into the tube-shaped fixed-bed reactor in the range of a space velocity of 6.0~24.0 $NL/g_{cat}/hr$. If the space velocity is less than the lower limit, the reaction may progress commonly but productivity of liquid hydrocarbon per unit time becomes low. In contrast, if the space velocity is greater than the upper limit, CO conversion may decrease.

Although the reaction may progress at 250~350° C., it is preferably carried out in the range of 300~350° C. to increase the CO conversion and the yield of liquid hydrocarbon.

Therefore, upon FP synthesis reaction using the iron carbide/carbon nanocomposite catalyst containing potassium according to the present invention, as high temperature conditions of 300° C. or more are applied, high CO conversion and low production of methane may result, and selectivity of a $C_{5+}$ liquid hydrocarbon may be increased. Hence, the catalyst of the present invention may be applied to commercial processes, as a catalyst very suitable for use in high temperature FP reaction.

A better understanding of the present invention may be obtained via the following examples and comparative examples, which are set forth to illustrate, but are not to be construed as limiting the present invention.

Example 1

Preparation of Iron Carbide/Potassium/Activated Carbon Catalyst by Pre-Addition of Potassium In order to achieve uniform and high incorporation of a hydrated iron metal salt into a carbon support, upon initial impregnation of the carbon support with the metal salt, the ratio of the salt relative to the support carbon [S/C ratio=Salt (amount of salt (g))/Carbon (amount of carbon (g)] was set to 1.4.

Specifically, to obtain a catalyst containing potassium (K) in an amount of 0.5 wt % based on the total amount thereof, 42 g of $Fe(NO_3)_3 9H_2O$ (Aldrich, 98+%, fw=404 g/mol, m.p.=47.2° C.) and 30 g of activated charcoal (Aldrich, −100 mesh particle size, fw=12.01 g/mol) were sufficiently ground along with 0.323 g of $K_2CO_3$ (Aldrich, powder, fw=139.205 g/mol) using a mortar and pestle until the color was made uniform.

Thereafter, the resulting black mixed powder was placed in a polypropylene vessel, after which the cap of the vessel was tightly shut and the vessel was placed in a drying oven at 50° C. and stored for 24 hr. After aging for 24 hr, the mixed powder was dried at room temperature, and then uniformly ground once more. Finally, thermal treatment was performed in a calcination oven in a CO gas atmosphere (atmospheric pressure, flow rate of 200 ml/min) at 350° C. for 4 hr, thus obtaining an iron carbide/potassium/activated carbon catalyst.

When the catalyst powder thus obtained is exposed to air, it is susceptible to oxidation. Hence, the catalyst was passivated by being wet with ethanol in a state of forming an atmosphere blocked from air using an inert gas such as nitrogen or helium immediately after activation of the catalyst, after which the catalyst wet with ethanol was dried in a vacuum oven, followed by final vacuum packing, whereby the catalyst was stored stably. Also, the same process as above was applied, and the amount of $K_2CO_3$ used together in the initial step was adjusted to 0.652 g and 1.997 g, giving iron carbide/potassium/activated carbon composite catalysts containing K in amounts of 1 wt % and 3 wt %.

Among the samples thus obtained, the sample containing 1.0 wt % of K was analyzed using ICP-AES (Inductively coupled plasma atomic emission spectroscopy), and the amount of iron was thus determined to be about 16 wt %.

Figure 5:
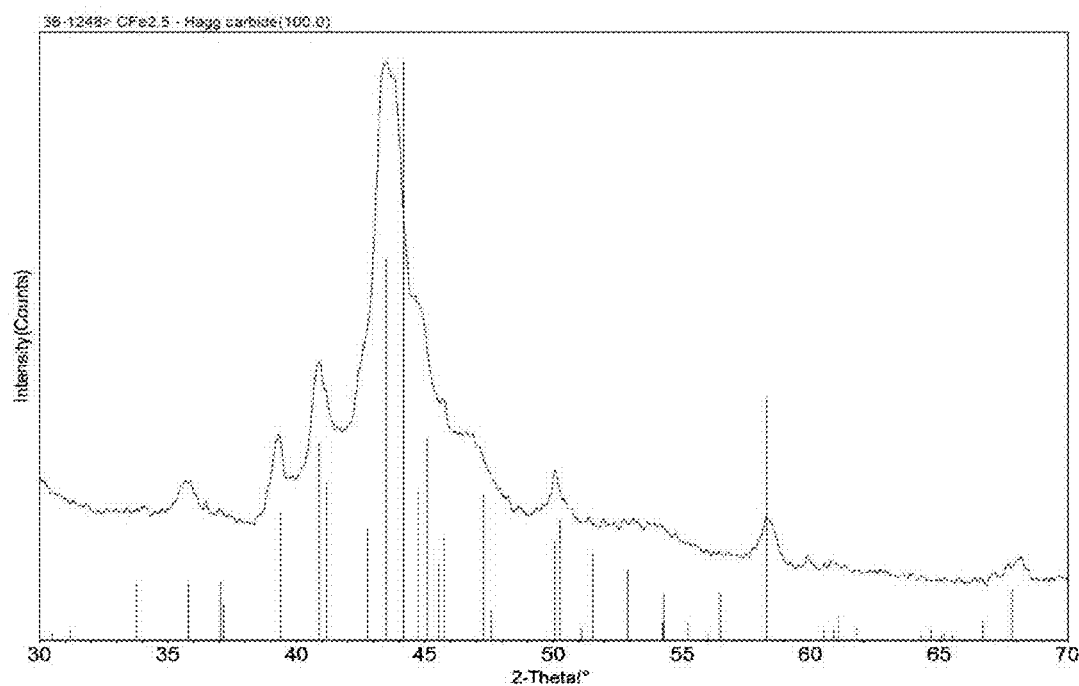
FIG. 5 is a graph illustrating XRD spectrum of an iron carbide/potassium/activated carbon catalyst containing 1.0 wt % of potassium (K) prepared using a pre-addition process according to an embodiment of the present invention.

As illustrated in FIG. 5, the crystalline phase of the particles was confirmed to be Hägg carbide, namely c-$Fe_5C_2$, well-known as a species having high activity among iron carbide phases through XRD (X-ray Diffraction) analysis.

Figure 6:
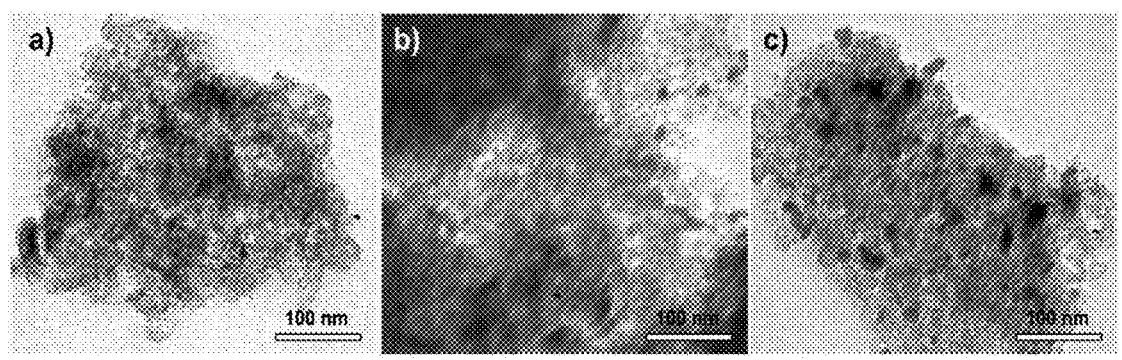
FIGS. 6A, 6B and 6C are transmission electron microscopy (TEM) images illustrating iron carbide/potassium/carbon nanocomposite catalysts prepared through pre-addition of a potassium salt according to an embodiment of the present invention, containing potassium (K) supported in an amount of 0.5 wt %, 1.0 wt % and 3.0 wt %, respectively.

The formation of the particles depending on the amount of added K was analyzed using TEM (Transmission electron microscopy). As is apparent from the results of analysis of TEM of FIGS. 6A to 6C, as the amount of K was higher, the size of the formed iron carbide particles was slightly increased. The size of the particles merely approximated to 5 nm upon addition of K in a small amount of 0.5 wt %, but was increased up to 20~30 nm upon addition of 3.0 wt % of K.

Example 2

Preparation of Iron Carbide/Potassium/Activated Carbon Catalyst by Mid-Addition of Potassium In order to achieve uniform and high incorporation of a hydrated iron metal salt into a carbon support, upon initial impregnation of the carbon support with the metal salt, the ratio of the salt relative to the support carbon [S/C ratio=Salt (amount of salt (g))/Carbon (amount of carbon (g)] was set to 1.43.

Specifically, to obtain a catalyst containing K in an amount of 0.2 wt % based on the total amount thereof, 4.29 g of $Fe(NO_3)_3 9H_2O$ (Aldrich, 98+%, fw=404 g/mol, m.p.=47.2° C.) and 3.0 g of activated charcoal (Aldrich, −100 mesh particle size, fw=12.01 g/mol) were sufficiently ground using a mortar and pestle until they were made uniform.

Thereafter, the resulting black mixed powder was placed in a polypropylene vessel, after which the cap of the vessel was tightly shut and the vessel was placed in a drying oven at 50° C. and stored for 24 hr. After aging for 24 hr, the mixed powder was dried at room temperature, and then uniformly ground once more.

Thereafter, 13 mg of $K_2CO_3$ dissolved in 1 ml of distilled water was dividedly added dozens of times by 0.04 ml each time using a micropipette.

Thereafter, the naturally dried powder was thermally treated in a calcination oven in a CO gas atmosphere (atmospheric pressure, flow rate of 200 ml/min) at 350° C. for 4 hr, giving an iron carbide/potassium/activated carbon catalyst. The same process as above was applied, and the amount of $K_2CO_3$ used together was adjusted to 32 mg, 65 mg and 199 mg, thereby obtaining iron carbide/potassium/activated carbon composite catalysts containing K in amounts of 0.5 wt %, 1.0 wt % and 3.0 wt %.

Figure 7:
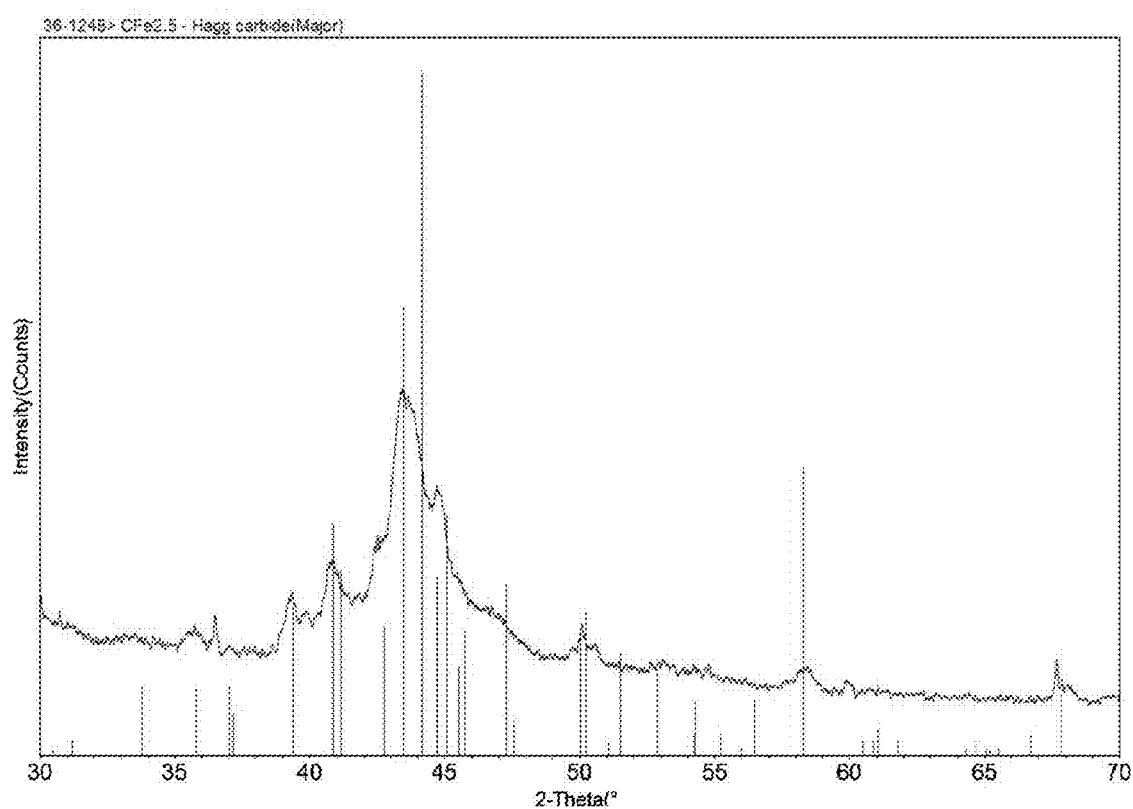
FIG. 7 is a graph illustrating XRD spectrum of an iron carbide/potassium/activated carbon catalyst containing 3.0 wt % of potassium (K) prepared using a mid-addition process according to another embodiment of the present invention.
Figure 8:
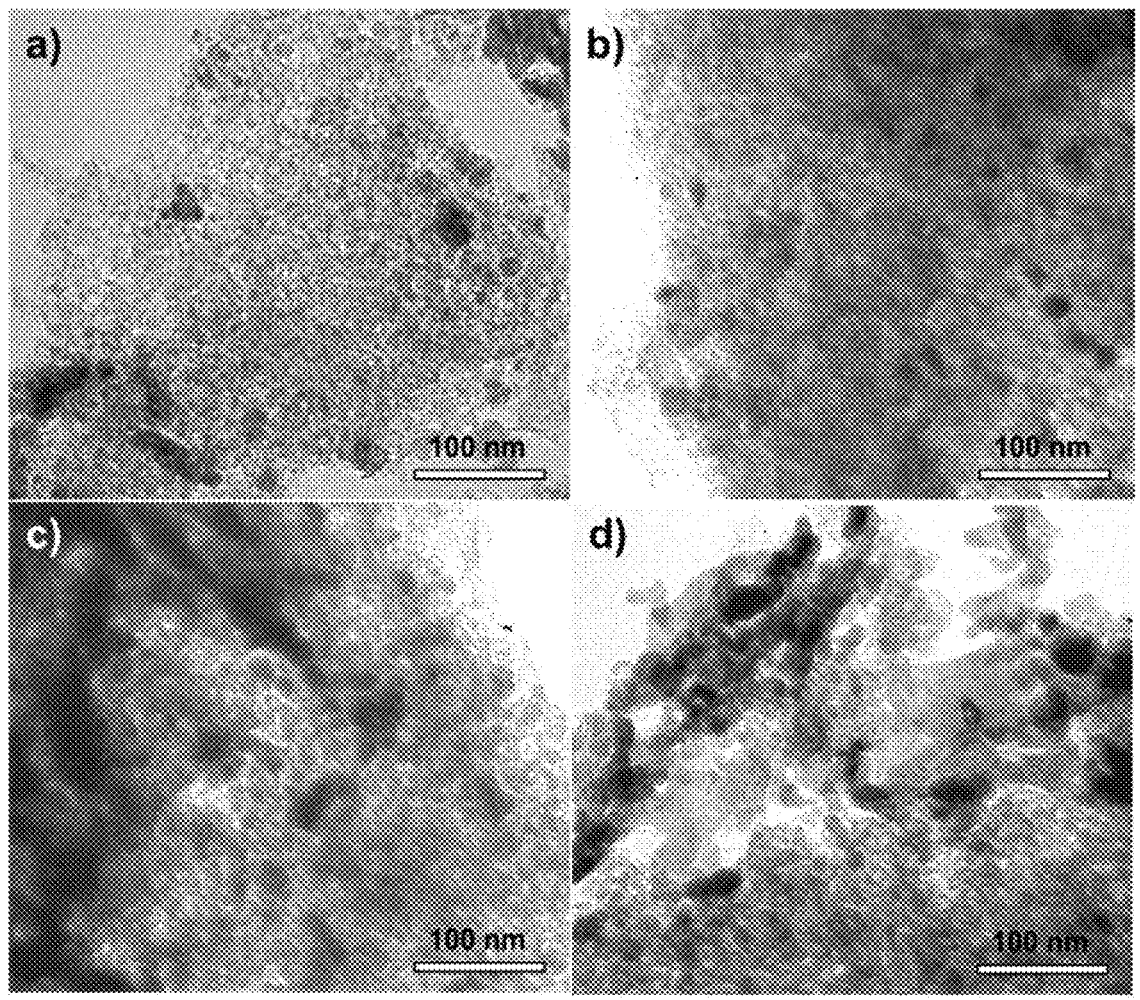
FIGS. 8A, 8B, 8C and 8D are TEM images illustrating iron carbide/potassium/carbon nanocomposite catalysts prepared through mid-addition of a potassium salt according to another embodiment of the present invention, containing K supported in an amount of 0.2 wt %, 0.5 wt %, 1.0 wt % and 3.0 wt %, respectively.

As illustrated in FIG. 7, the samples thus obtained were subjected to XRD analysis, from which the crystalline phase of the particles was confirmed to be mainly Hägg carbide, well-known as a species having high activity among iron carbide phases.

TEM analysis was performed to observe changes in the particles depending on the amount of added K. The results are illustrated in FIGS. 8A to 8D. Likewise in the above addition process, the size of the particles was slightly increased in proportion to an increase in the amount of K. Also, compared to the pre-addition process, the particles were more slightly irregularly enlarged despite the use of K in the same amount.

Example 3

Preparation of Preparation of Iron Carbide/Potassium/Activated Carbon Catalyst by Post-Addition of Potassium In order to achieve uniform and high incorporation of a hydrated iron metal salt into a carbon support, upon initial impregnation of the carbon support with the metal salt, the ratio of the salt relative to the support carbon [S/C ratio=Salt (amount of salt (g))/Carbon (amount of carbon (g)] was set to 1.43.

Specifically, 4.29 g of $Fe(NO_3)_3 9H_2O$ (Aldrich, 98+%, fw=404 g/mol, m.p.=47.2° C.) and 3.0 g of activated charcoal (Aldrich, −100 mesh particle size, fw=12.01 g/mol) were sufficiently ground using a mortar and pestle until they were made uniform.

Thereafter, the resulting black mixed powder was placed in a polypropylene vessel, after which the cap of the vessel was tightly shut and the vessel was placed in a drying oven at 50° C. and stored for 24 hr.

After aging for 24 hr, the mixed powder was dried at room temperature, and then evenly ground once more. Subsequently, thermal treatment was performed in a calcination oven in a CO gas atmosphere (atmospheric pressure, flow rate of 200 ml/min) at 350° C. for 4 hr, thus obtaining an iron carbide/activated carbon catalyst. Subsequently, to obtain a catalyst containing K in an amount of 0.2 wt % based on the total amount thereof, 13 mg of $K_2CO_3$ dissolved in 1 ml of distilled water was dividedly added dozens of times by 0.04 ml each time to the iron carbide/activated carbon catalyst powder using a micropipette.

Thereafter, the naturally dried powder was thermally treated in a calcination oven in a CO gas atmosphere (atmospheric pressure, flow rate of 200 ml/min) at 350° C. for 4 hr, thus obtaining an iron carbide ($FeC_x$)/K/charcoal catalyst.

The same process as above was applied and the amount of $K_2CO_3$ used together was adjusted to 32 mg, 65 mg and 199 mg, giving iron carbide/potassium/activated carbon composite catalysts containing K in amounts of 0.5 wt %, 1 wt % and 3 wt %.

Figure 9:
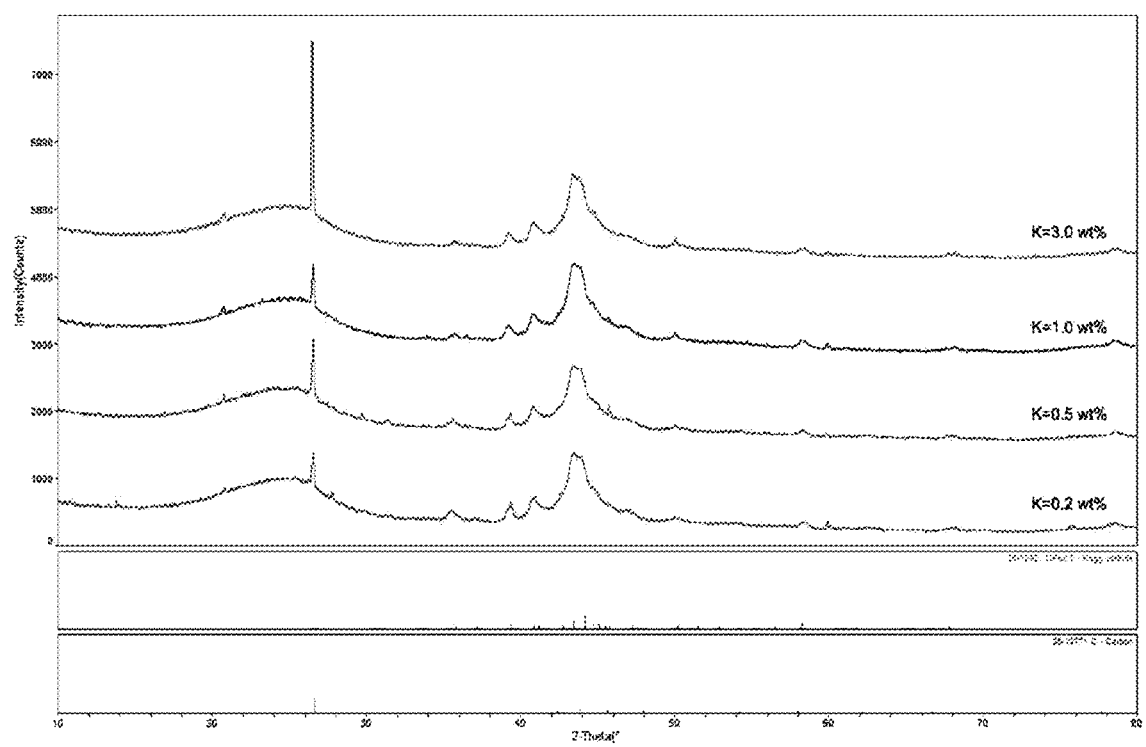
FIG. 9 is a graph illustrating XRD spectrum of an iron carbide/potassium/activated carbon catalyst containing 3.0 wt % of K prepared using a post-addition process according to still another embodiment of the present invention.
Figure 10:
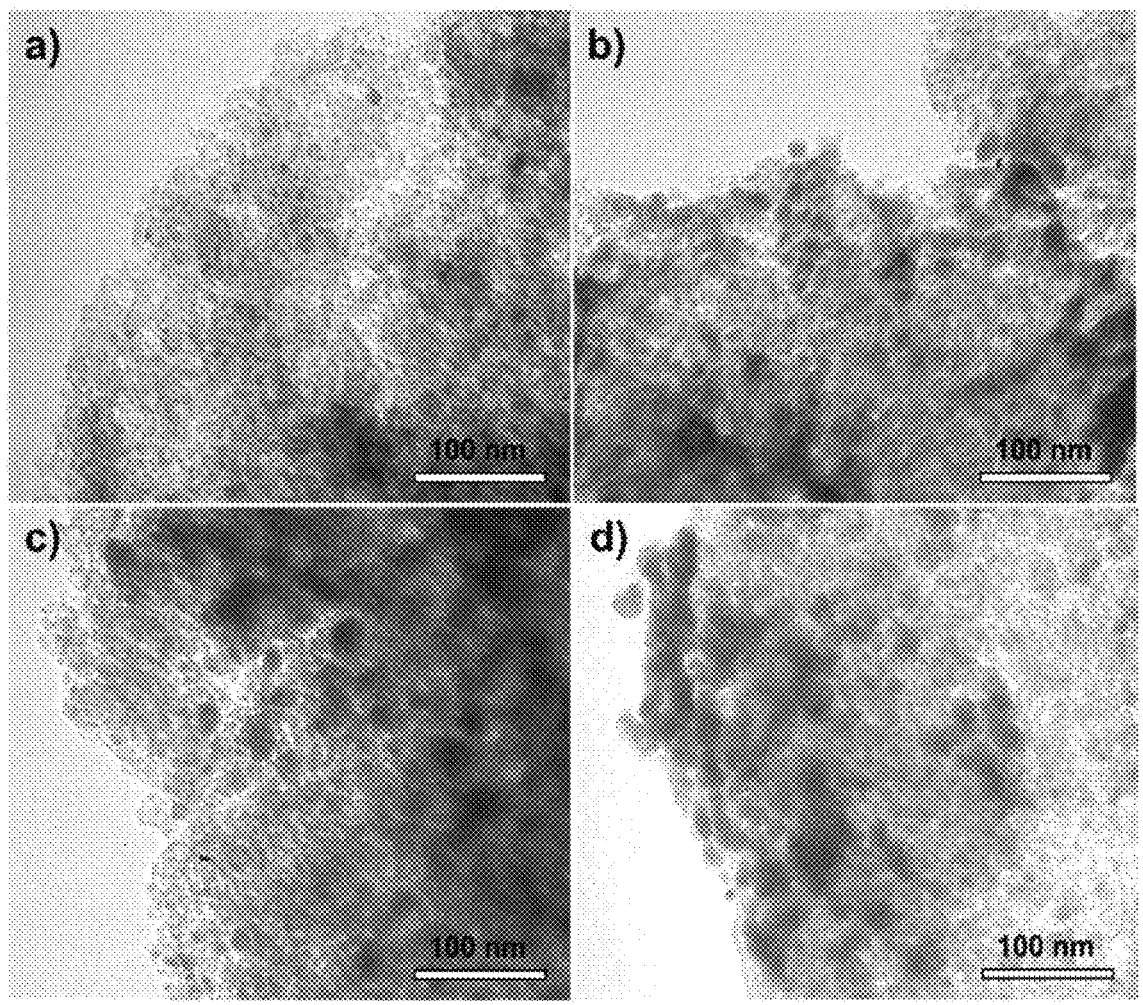
FIGS. 10A, 10B, 10C and 10D are TEM images illustrating iron carbide/potassium/carbon nanocomposite catalysts prepared through post-addition of a potassium salt according to still another embodiment of the present invention, containing K supported in an amount of 0.2 wt %, 0.5 wt %, 1.0 wt % and 3.0 wt %, respectively.

As illustrated in FIG. 9, the samples thus obtained were subjected to XRD analysis, from which the crystalline phase of the particles was confirmed to be mainly Hagg carbide, well-known as a species having high activity among iron carbide phases. In particular, there is no great change in morphology of the particle phase depending on the amount of added K.

TEM analysis was performed to observe changes in the particles depending on the amount of added K. The results are illustrated in FIGS. 10A to 10D. Likewise in the above addition processes, the size of the particles was more slightly increased in proportion to an increase in the amount of K.

Example 4

Preparation of Iron Carbide/Potassium/CMK-3 Catalyst by Post-Addition of Potassium As the carbon support instead of activated carbon, CMK-3 may be used. CMK-3 has a greater pore volume than that of activated carbon, and thereby may be advantageously impregnated with a larger amount of iron hydrate. In order to achieve uniform and high incorporation of a hydrated iron metal salt, upon initial impregnation of CMK-3 with the metal salt, the ratio of the salt relative to the support carbon [S/C ratio=Salt (amount of salt (g))/Carbon (amount of carbon (g)] was increased to 2.16.

Specifically, 2.16 g of $Fe(NO_3)_3 \cdot 9H_2O$ (Aldrich, 98+%, fw=404 g/mol, m.p.=47.2° C.) and 1.0 g of CMK-3 (ordered mesoporous carbon, ACS Material, BET SSA=~800 m²/g, pore volume=~1.35 cm³/g, Size ~0.05~5 mm) were sufficiently ground using a mortar and pestle until they were made uniform. Thereafter, the resulting black mixed powder was placed in a polypropylene vessel, after which the cap of the vessel was tightly shut and the vessel was placed in a drying oven at 50° C. and stored for 24 hr.

After aging for 24 hr, the mixed powder was dried at room temperature, and then evenly ground once more. Subsequently, thermal treatment was performed in a calcination oven in a CO gas atmosphere (atmospheric pressure, flow rate of 200 ml/min) at 350° C. for 4 hr, thus obtaining an iron carbide/CMK-3 catalyst.

As such, the amount of iron was analyzed to be about 22 wt % by ICP-AES.

Subsequently, to obtain a catalyst containing K in an amount of 0.2 wt % based on the total amount thereof, 3.7 mg of $K_2CO_3$ dissolved in 1 ml of distilled water was dividedly added dozens of times by 0.04 ml each time to the iron carbide/CMK-3 catalyst powder using a micropipette.

Thereafter, the naturally dried powder was thermally treated in a calcination oven in a CO gas atmosphere (atmospheric pressure, flow rate of 200 ml/min) at 350° C. for 4 hr, thus obtaining an iron carbide/potassium/CMK-3 catalyst.

The same process as above was applied and the amount of $K_2CO_3$ used together was adjusted to 11 mg and 37 mg, giving iron carbide/potassium/CMK-3 composite catalysts containing K in amounts of 0.5 wt % and 1.6 wt %.

Figure 11:
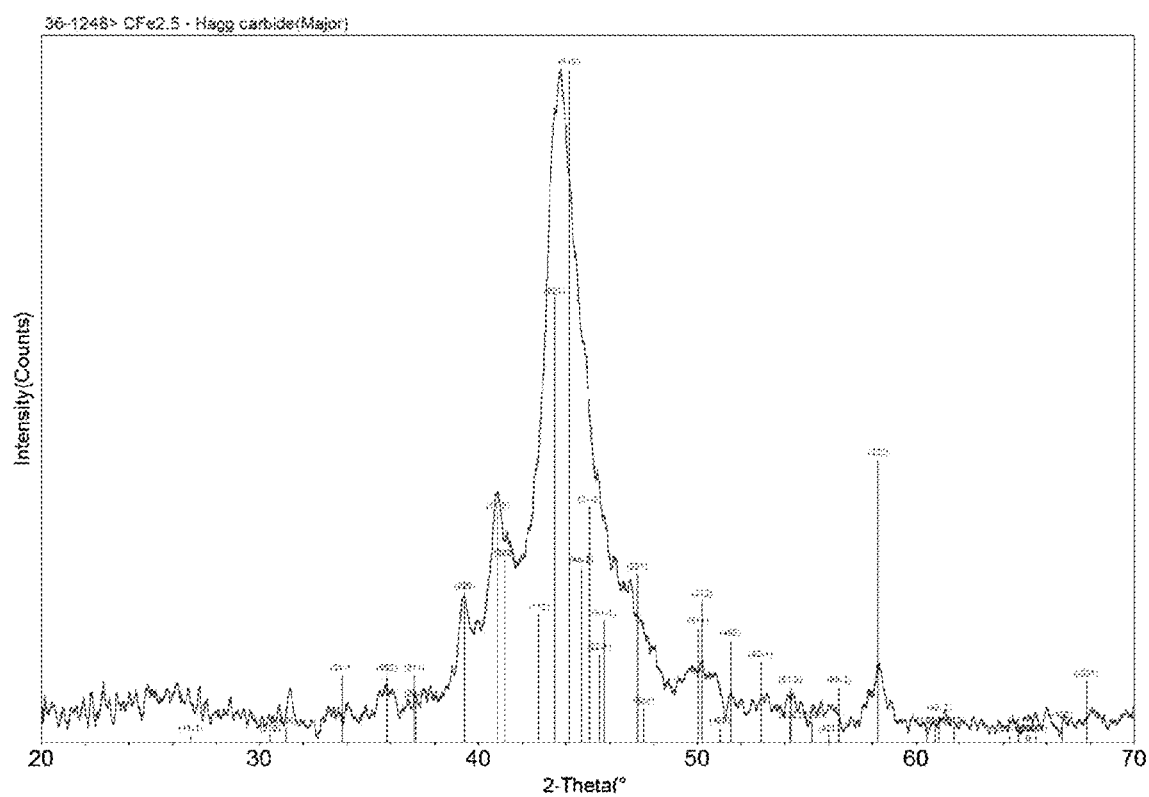
FIG. 11 is a graph illustrating XRD spectrum of an iron carbide/potassium/CMK-3 catalyst containing 1.6 wt % of K prepared using a post-addition process according to still another embodiment of the present invention.
Figure 12:
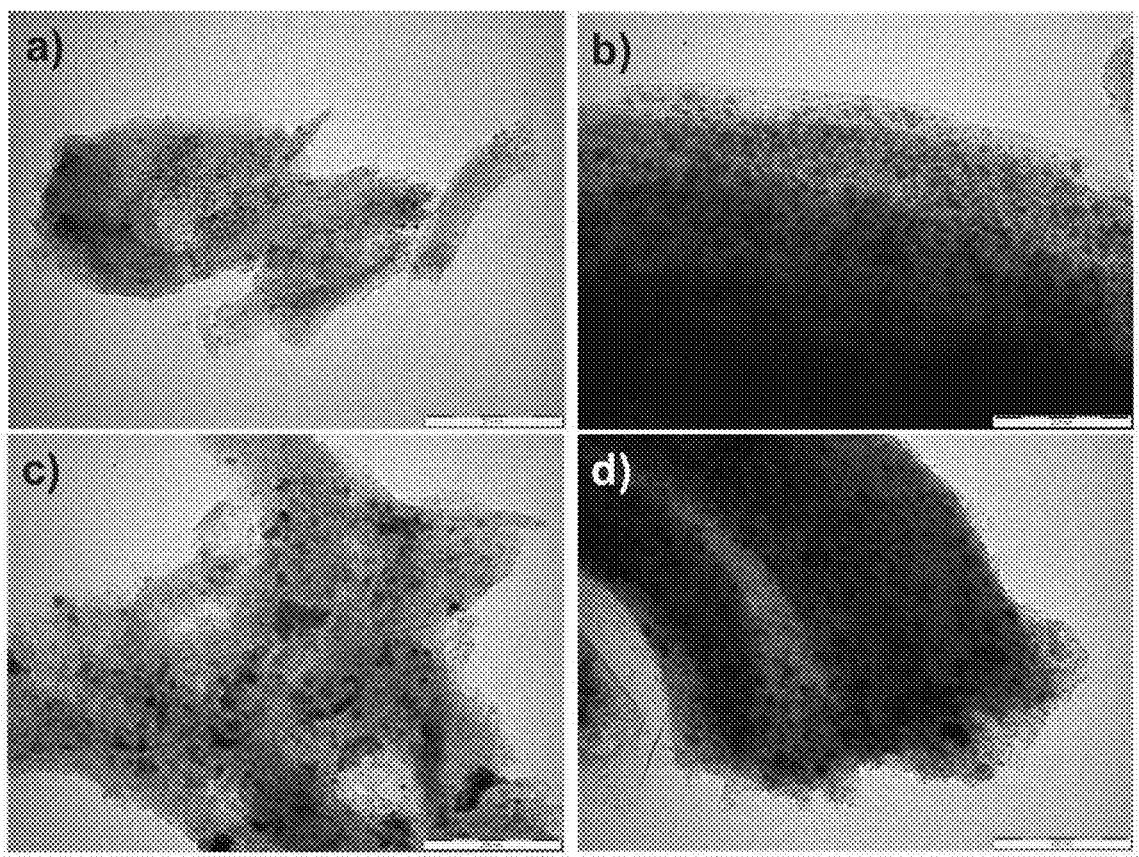
FIGS. 12A, 12B, 12C and 12D are TEM images illustrating iron carbide/potassium/CMK-3 catalysts prepared using a post-addition process according to still another embodiment of the present invention, containing K supported in an amount of 0.0 wt % (K-free), 0.2 wt %, 0.5 wt % and 1.6 wt %, respectively.

As illustrated in FIG. 11, the samples thus obtained were subjected to XRD analysis, from which the crystalline phase of the particles was confirmed to be mainly Hagg carbide, well-known as a species having high activity among iron carbide phases.

TEM analysis was performed to observe changes in the particles depending on the amount of added K. The results are illustrated in FIGS. 12A to 12D. Likewise in the above addition processes, the size of the particles was slightly increased in proportion to an increase in the amount of K, but the extent of change in such a size was insignificant, compared to when using activated carbon as the support.

Furthermore, although iron was supported in an amount larger by 6 wt % compared to when using activated carbon as the support, there was no decrease in particle size and dispersibility.

Figure 13:
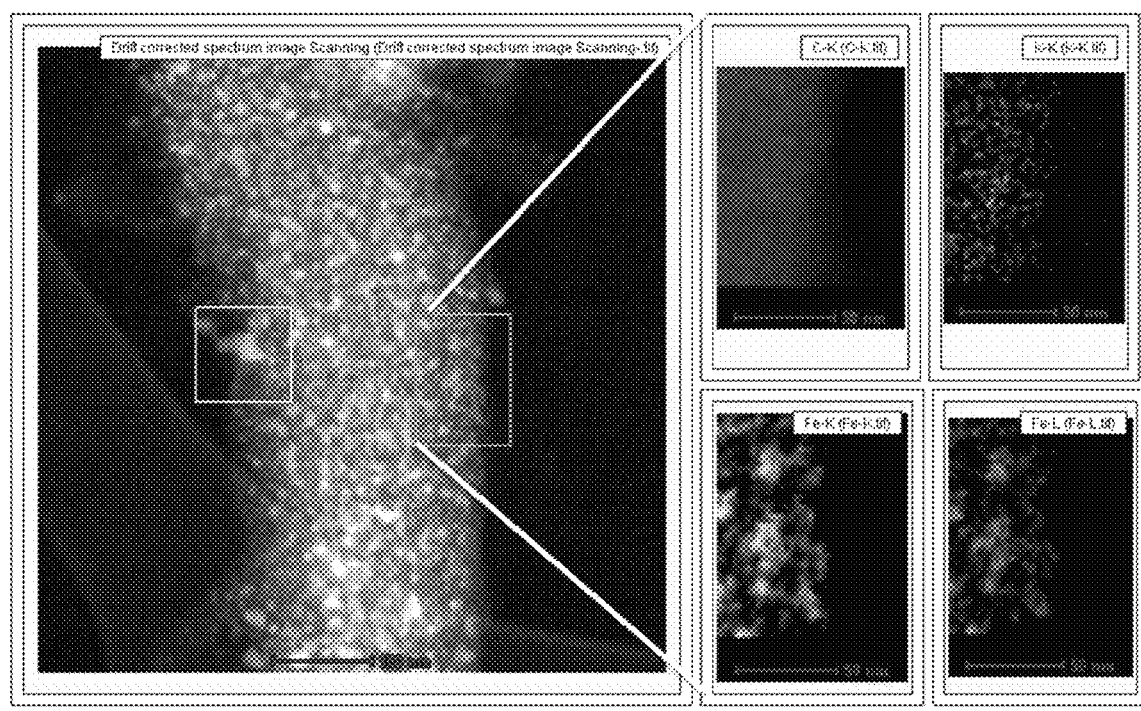
FIG. 13 illustrates a high angle annular dark field (HAADF) TEM image (left) and scanning transmission electron microscopy (STEM) images (right) of the iron carbide/potassium/CMK-3 catalyst containing 1.6 wt % of K prepared using a post-addition process according to still another embodiment of the present invention.

In particular, as seen in the HAADF (High Angle Annular Dark Field) TEM image of FIG. 13, the iron carbide particles were uniformly dispersed in the carbon support, and potassium was also uniformly dispersed as shown in the STEM (Scanning Transmission Electron Microscopy) images.

Example 5

Fischer-Tropsch Reaction Using Iron Carbide/Potassium/Activated Catalyst

Fischer-Tropsch synthesis reaction was carried out in the presence of the $FeC_x$/K/charcoal catalyst obtaining by supporting 0.5 wt % of K by the post-addition process of Example 3.

To compare catalyst performance, a K-free catalyst was prepared in the same manner under the same conditions as above.

To evaluate the properties of the catalyst, a fixed-bed reactor was used, and the reaction procedure was based on an automated system operable by PC (Personal Computer).

Immediately after drying the obtained catalyst, 0.5 g of the dried catalyst was loaded into the reactor having an inner diameter of 5 mm. To prevent formation of hot spots due to severe heating of the catalyst during the reaction, 1.6 g of glass beads were further added.

Figure 14:
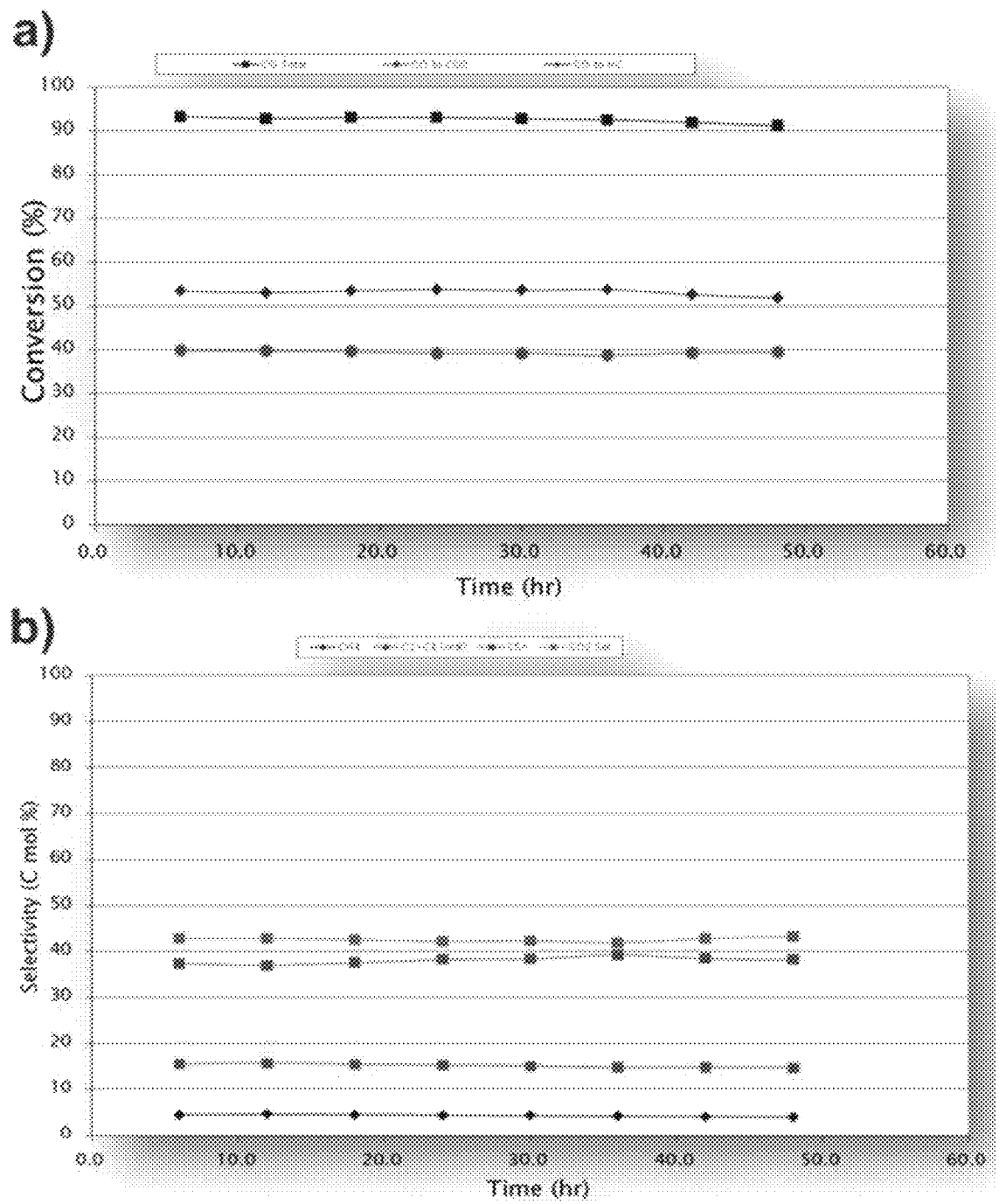
FIGS. 14A and 14B are graphs illustrating CO conversion over time and product selectivity, respectively, of the catalyst containing 0.5 wt % of K according to still another embodiment of the present invention.

The reaction was immediately carried out without any further reduction in the reactor, and synthesis gas comprising hydrogen and carbon monoxide maintained at a ratio of 1:1 was fed into the reactor under conditions of a reaction pressure of 15 atm and GHSV (Gas Hourly Space Velocity) of 9.6 NL/G(cat)-h, so that Fischer-Trosch synthesis reaction was carried out at 340° C. The reaction results for 48 hr are shown in FIGS. 14A and 14B and Table 1 below.

TABLE 1

| | | | | | Liquid Productivity (g/g-cat × hr) | |
|---|---|---|---|---|---|---|
| CO Conv. | $CO_2$ sel. | $CH_4$ sel. | $C_2$-$C_4$ sel. | $C_{5+}$ sel. | Calculated at 48 h ($C_{5+}$) | $C_5$-$C_{12}$ (SIMDIS) wt % |
| 91.2 | 43.2 | 3.93 | 14.6 | 38.2 | 1.05 | 76.99 |

<Average CO Conversion and Product Selectivity of 0.5 Wt % of K-Supported Catalyst for 48 Hr>

Figure 15:
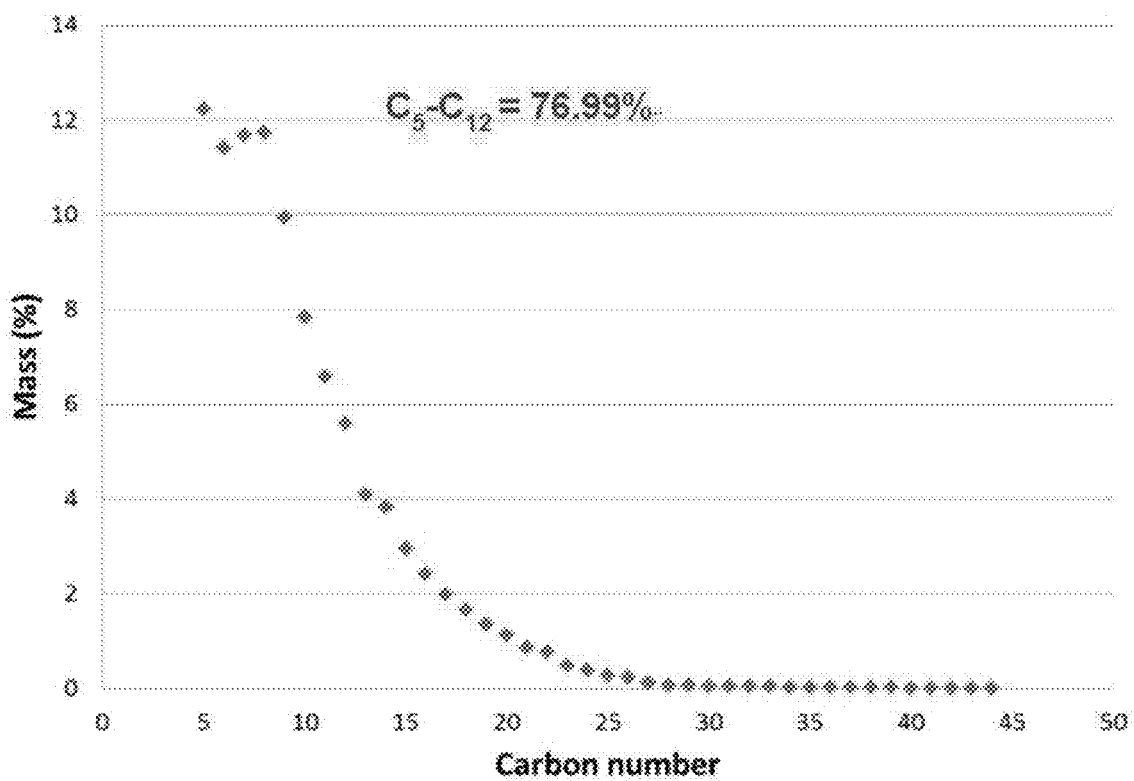
FIG. 15 is a graph illustrating the results of simulated distillation (SIMDIS) analysis of liquid products according to a further embodiment of the present invention.

As is apparent from the reaction results of FIGS. 14A and 14B and Table 1, in the case where the Fischer-Tropsch synthesis reaction according to the present invention was carried out, the CO conversion was 91%, and the productivity of $C_{5+}$ liquid hydrocarbon products was as high as 1.05 g/g-cat-h. As illustrated in FIG. 15, as the results of SIMDIS (Simulated Distillation) analysis of the liquid products excluding wax, selectivity of C5~C12 was very high to the level of 77%.

Figure 16:
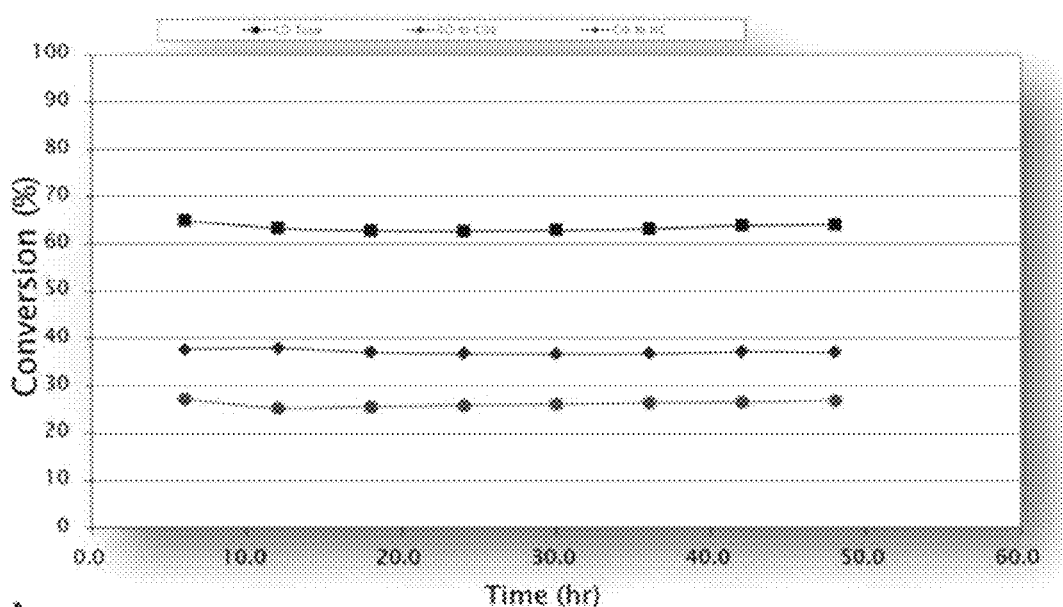
FIGS. 16A and 16B are graphs illustrating CO conversion over time and product selectivity, respectively, of a K-free iron carbide/activated carbon catalyst, unlike the present invention.
Figure 16:
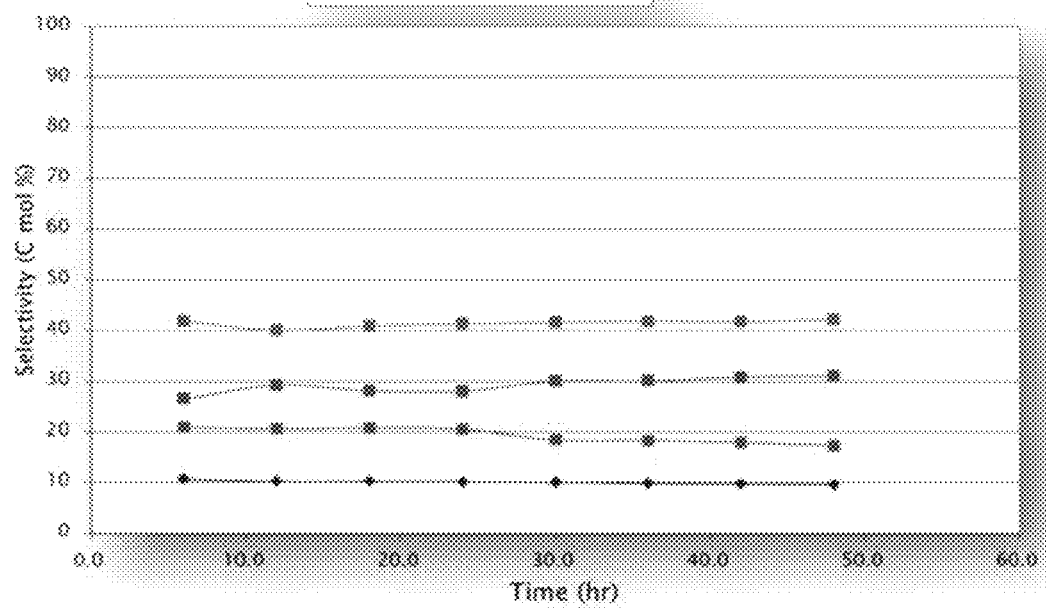

The reactivity was compared using the catalyst prepared in the same manner as above except that potassium was not added. As shown in FIGS. 16A and 16B and Table 2 below, the activity thereof was considerably lowered.

TABLE 2

| | | | | | Liquid Productivity (g/g-cat × hr) | |
|---|---|---|---|---|---|---|
| CO Conv. | $CO_2$ sel. | $CH_4$ sel. | $C_2$-$C_4$ sel. | $C_{5+}$ sel. | Calculated at 48 h ($C_{5+}$) | $C_5$-$C_{12}$ (SIMDIS) wt % |
| 64.1 | 42.1 | 9.57 | 17.3 | 31.0 | 0.598 | 79.15 |

<Average CO Conversion and Product Selectivity of K-Free Iron Carbide/Activated Carbon Catalyst for 48 Hr>

Also, the reaction was carried out under at different temperatures and flow rates as shown in Table 3 below using the iron carbide/potassium/activated carbon catalyst impregnated with 5 wt % of K, and the resulting activity and selectivity were evaluated.

TABLE 3

| Temp. (° C.) | GHSV (NL/G(cat)-h) | CO Conv. | $CO_2$ sel. | $CH_4$ sel. | $C_2$-$C_4$ sel. | $C_{5+}$ sel. | Liquid Productivity (g/g$_{cat}$ × hr) Calculated at 48 h ($C_{5+}$) | $C_5$-$C_{12}$ (SIMDIS) wt % |
|---|---|---|---|---|---|---|---|---|
| 320 | 4.8 | 96.5 | 41.6 | 3.95 | 14.4 | 40.0 | 0.58 | 77.4 |
| 330 | 7.2 | 94.5 | 42.7 | 3.77 | 14.5 | 39.0 | 0.83 | 76.4 |

<Average CO Conversion and Product Selectivity of 0.5 Wt % of K-Supported Catalyst for 48 Hr Under Various Reaction Conditions>

Comparative Example 1

Fischer-Tropsch Reaction Using Iron Carbide/Potassium/Activated Carbon Catalyst

A Fischer-Tropsch synthesis reaction was carried out using the iron carbide/potassium/activated carbon catalyst impregnated with 3.1 wt % of potassium as obtained by the pre-addition process of Example 1. This reaction was immediately carried out without any further reduction in the reactor, and synthesis gas comprising hydrogen and carbon monoxide maintained at a ratio of 1:1 was fed into the reactor under conditions of a reaction pressure of 15 atm and GHSV of 3.0 NL/G(cat)-h, so that Fischer-Tropsch reaction was conducted at 330° C. The results of reaction for 72 hr are represented in FIGS. 17A and 17B.

Figure 17:
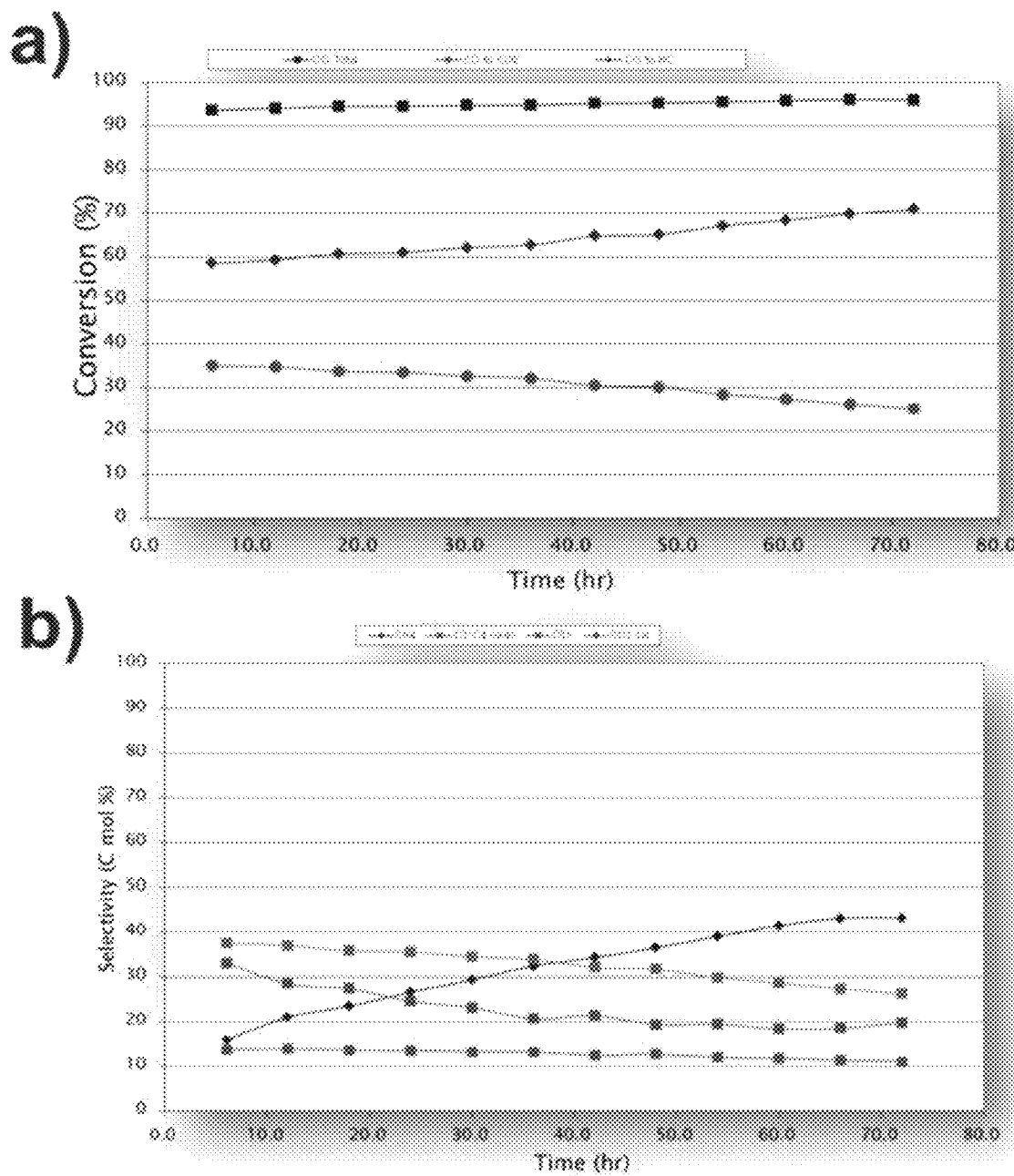
FIGS. 17A and 17B are graphs illustrating CO conversion over time and product selectivity, respectively, of the catalyst containing 3.1 wt % of K, unlike the present invention.

As seen in FIGS. 17A and 17B, when potassium was excessively added in an amount of 3.1 wt %, the amount of generated methane was remarkably increased over time during the Fisher-Tropsch reaction, and productivity of liquid hydrocarbons was decreased.

As described hereinbefore, the present invention provides a method of preparing an iron carbide/carbon nanocomposite catalyst containing potassium for high temperature FT synthesis reaction and the iron carbide/carbon nanocomposite catalyst prepared thereby, and a method of manufacturing a liquid hydrocarbon using the same and a liquid hydrocarbon manufactured thereby. According to the present invention, a highly active iron carbide/potassium/carbon composite catalyst for high temperature FT reaction wherein a porous carbon support is impregnated with 5~30 wt % of active iron carbide particles can be obtained.

Also according to the present invention, in the course of preparation of the highly active iron carbide/potassium/carbon composite catalyst for high temperature FT reaction, melt infiltration, external activation in a CO gas atmosphere, and incipient wetness impregnation of a potassium salt can be used together, thus enabling mass production of an active iron carbide catalyst.

Also according to the present invention, the catalyst preparation method enables a potassium promoter to be uniformly supported via incipient wetness impregnation using various processes including a pre-addition process, a mid-addition process and a post-addition process, thus improving catalytic reactivity, decreasing methane selectivity, and increasing liquid hydrocarbon selectivity.

Also according to the present invention, the highly active iron carbide/potassium/carbon composite catalyst for high temperature FT reaction is structurally stable to heat even upon high temperature FT reaction at 300° C. or more, and allows a liquid hydrocarbon to be selectively obtained at high yield. Therefore, industrial use thereof is significantly expected.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of preparing an iron carbide and carbon carbide/carbon nanocomposite catalyst containing potassium for high temperature Fischer-Tropsch synthesis reaction, comprising:
   mechanically uniformly grinding non-liquid reagents: an iron hydrate powder, a potassium salt powder and a porous carbon support powder, thus forming a mixed powder wherein the carbon support is not in the form of carbon nanotubes;
   subjecting the mixed powder to melt infiltration at a temperature near a melting point of the iron hydrate in a reaction vessel;
   drying the mixed powder at room temperature;
   calcining the dried mixed powder at a high temperature in an activation gas atmosphere selected from CO and a mixture of CO and $H_2$, so as to be activated to form iron carbide particles containing potassium on the carbon support, thus obtaining an iron carbide and carbon nanocomposite catalyst containing potassium;
   adding the calcined iron carbide and carbon nanocomposite catalyst containing potassium to an organic solvent so as to be stabilized via anti-oxidation passivation; and
   recovering the iron carbide and carbon nanocomposite catalyst containing potassium from the organic solvent using a magnet, and then performing vacuum drying.

2. The method of claim 1, wherein the iron hydrate is supported in an amount of 0.5~3.0 g per unit gram of the carbon support.

3. The method of claim 1, wherein an amount of an iron element decomposed from the iron hydrate is 5~30 wt %, and an amount of a potassium element is 0.1~3.0 wt %, based on a total amount of the catalyst including the carbon support.

4. The method of claim 1, wherein the iron hydrate has a melting point of 30~100° C.

5. The method of claim 4, wherein the melt infiltration is performed in a closed system under a temperature condition in which a temperature of the reaction vessel is set to be higher by 2~5° C. than the melting point of the iron hydrate.

6. The method of claim 1, wherein the iron hydrate is at least one selected from among $Fe(NO_3)_3 9H_2O$ (d=1.68 g/cm$^3$, m.p.=47.2° C.), $FeCl_3 6H_2O$ (d=1.82 g/cm$^3$, m.p.=37° C.), and $FeSO_4 7H_2O$ (1.898 g/cm$^3$, m.p.=70° C.).

7. The method of claim 1, wherein the porous carbon support has a minimum pore volume of 0.2 cm³/g or more.

8. The method of claim 1, wherein the porous carbon support is any one selected from among commercially available activated carbon, commercially available activated charcoal, commercially available acetylene carbon black, and ordered mesoporous carbon CMK (CMK-3, CMK-5, CMK-8).

9. The method of claim 1, wherein the calcining is performed at 300~400° C.

10. The method of claim 1, wherein the calcining is performed for 1~24 hr while allowing the activation gas at a rate of 100 ml or more per min.

11. The method of claim 1, wherein the organic solvent is any one selected from among ethanol and mineral oil.

12. A method of preparing an iron carbide and carbon nanocomposite catalyst containing potassium for high temperature Fischer-Tropsch synthesis reaction, comprising:

mechanically uniformly grinding non-liquid reagents: an iron hydrate powder and a porous carbon support powder, thus forming a mixed powder wherein the carbon support is not in the form of carbon nanotubes;

subjecting the mixed powder to melt infiltration at a temperature near a melting point of the iron hydrate in a reaction vessel;

drying the mixed powder at room temperature;

impregnating the dried mixed powder with a potassium salt aqueous solution using incipient wetness impregnation;

calcining the mixed powder impregnated with potassium at a high temperature in an activation gas atmosphere selected from CO and a mixture of CO and $H_2$ so as to be activated to form iron carbide particles containing potassium on the carbon support, thus obtaining an iron carbide and carbon nanocomposite catalyst containing potassium;

adding the calcined iron carbide and carbon nanocomposite catalyst containing potassium to an organic solvent so as to be stabilized via anti-oxidation passivation; and recovering the iron carbide and carbon nanocomposite catalyst containing potassium from the organic solvent using a magnet, and then performing vacuum drying.

13. The method of claim 12, wherein the iron hydrate is supported in an amount of 0.5~3.0 g per unit gram of the carbon support.

14. The method of claim 12, wherein an amount of an iron element decomposed from the iron hydrate is 5~30 wt %, and an amount of a potassium element is 0.1~3.0 wt %, based on a total amount of the catalyst including the carbon support.

15. The method of claim 12, wherein the iron hydrate has a melting point of 30~100° C.

16. The method of claim 12, wherein the iron hydrate is at least one selected from among $Fe(NO_3)_3 \cdot 9H_2O$ (d=1.68 g/cm³, m.p.=47.2° C.), $FeCl_3 \cdot 6H_2O$ (d=1.82 g/cm³, m.p.=37° C.), and $FeSO_4 \cdot 7H_2O$ (1.898 g/cm³, m.p.=70° C.).

17. The method of claim 12, wherein the porous carbon support has a minimum pore volume of 0.2 cm³/g or more.

18. The method of claim 12, wherein the porous carbon support is any one selected from among commercially available activated carbon, commercially available activated charcoal, commercially available acetylene carbon black, and ordered mesoporous carbon CMK (CMK-3, CMK-5, CMK-8).

19. The method of claim 12, wherein the calcining is performed at 300~400° C.

20. The method of claim 12, wherein the calcining is performed for 1~24 hr while allowing the activation gas at a rate of 100 ml or more per min.

21. The method of claim 12, wherein the melt infiltration is performed in a closed system under a temperature condition in which a temperature of the reaction vessel is set to be higher by 2~5° C. than the melting point of the iron hydrate.

22. The method of claim 12, wherein the organic solvent is any one selected from among ethanol and mineral oil.

23. The method of claim 12, wherein the potassium salt is used in a solution form by being dissolved in water or an organic solvent, and is any one or more selected from among KOH, KI, KCl, KBr, $K_2CO_3$, $K_2Cr_2O_7$, $KNO_3$, $KC_2H_3O_2$, $KMnO_4$, KCN, $KIO_3$, $K_2S_2O_8$, $K_2SO_4$, KSCN, $KClO_3$, KF, KH, $KH_2PO_4$, $C_4H_9KO$, and $C_6H_5K_3O_7$.

24. A method of preparing an iron carbide and carbon nanocomposite catalyst containing potassium for high temperature Fischer-Tropsch synthesis reaction, comprising:

mechanically uniformly grinding non-liquid reagents: an iron hydrate powder and a porous carbon support powder, thus forming a mixed powder wherein the carbon support is not in the form of carbon nanotubes;

subjecting the mixed powder to melt infiltration at a temperature near a melting point of the iron hydrate in a reaction vessel;

drying the mixed powder at room temperature;

calcining the dried mixed powder at a high temperature in an activation gas atmosphere selected from CO and a mixture of CO and $H_2$ so as to be activated to form pure iron carbide particles on the carbon support, thus obtaining an iron carbide and carbon nanocomposite catalyst;

adding the calcined iron carbide and carbon nanocomposite catalyst to an organic solvent so as to be stabilized via anti-oxidation passivation, and then performing drying;

impregnating the dried mixed powder with a potassium salt aqueous solution using incipient wetness impregnation;

calcining the mixed powder impregnated with potassium at a high temperature in an activation gas atmosphere selected from CO and a mixture of CO and $H_2$ so as to be activated to form iron carbide particles containing potassium on the carbon support, thus obtaining an iron carbide and carbon nanocomposite catalyst containing potassium;

adding the activated iron carbide and carbon nanocomposite catalyst containing potassium to an organic solvent so as to be stabilized via anti-oxidation passivation, and then performing drying; and recovering the iron carbide and carbon nanocomposite catalyst containing potassium from the organic solvent using a magnet, and then performing vacuum drying.

25. The method of claim 24, wherein the iron hydrate is supported in an amount of 0.5~3.0 g per unit gram of the carbon support.

26. The method of claim 24, wherein an amount of an iron element decomposed from the iron hydrate is 5~30 wt %, and an amount of a potassium element is 0.1~3.0 wt %, based on a total amount of the catalyst including the carbon support.

27. The method of claim 24, wherein the iron hydrate has a melting point of 30~100° C.

28. The method of claim 24, wherein the iron hydrate is at least one selected from among $Fe(NO_3)_3 \cdot 9H_2O$ (d=1.68 g/cm$^3$, m.p.=47.2° C.), FeCl$_3$6H$_2$O (d=1.82 g/cm$^3$, m.p.=37° C.), and FeSO$_4$7H$_2$O (1.898 g/cm$^3$, m.p.=70° C.).

29. The method of claim 24, wherein the porous carbon support has a minimum pore volume of 0.2 cm$^3$/g or more.

30. The method of claim 24, wherein the porous carbon support is any one selected from among commercially available activated carbon, commercially available activated charcoal, commercially available acetylene carbon black, and ordered mesoporous carbon CMK (CMK-3, CMK-5, CMK-8).

31. The method of claim 24, wherein the calcining is performed at 300~400° C.

32. The method of claim 24, wherein the calcining is performed for 1~24 hr while allowing the activation gas at a rate of 100 ml or more per min.

33. The method of claim 24, wherein the melt infiltration is performed in a closed system under a temperature condition in which a temperature of the reaction vessel is set to be higher by 2~5° C. than the melting point of the iron hydrate.

34. The method of claim 24, wherein the organic solvent is any one selected from among ethanol and mineral oil.

35. The method of claim 24, wherein the potassium salt is used in a solution form by being dissolved in water or an organic solvent, and is any one or more selected from among KOH, KI, KCl, KBr, K$_2$CO$_3$, K$_2$Cr$_2$O$_7$, KNO$_3$, KC$_2$H$_3$O$_2$, KMnO$_4$, KCN, KIO$_3$, K$_2$S$_2$O$_8$, K$_2$SO$_4$, KSCN, KClO$_3$, KF, KH, KH$_2$PO$_4$, C$_4$H$_9$KO, and C$_6$H$_5$K$_3$O$_7$.

\* \* \* \* \*